United States Patent
Sasagawa et al.

(10) Patent No.: US 11,426,879 B2
(45) Date of Patent: Aug. 30, 2022

(54) DEVICE, METHOD, AND PROGRAM

(71) Applicant: Panasonic Intellectual Property Management Co., Ltd., Osaka (JP)

(72) Inventors: Michiko Sasagawa, Osaka (JP); Kento Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 453 days.

(21) Appl. No.: 16/736,866

(22) Filed: Jan. 8, 2020

(65) Prior Publication Data
US 2020/0269436 A1 Aug. 27, 2020

(30) Foreign Application Priority Data

Feb. 26, 2019 (JP) .............................. JP2019-033141

(51) Int. Cl.
| | | |
|---|---|---|
| *B25J 13/00* | (2006.01) | |
| *G06F 3/0488* | (2022.01) | |
| *H04N 5/225* | (2006.01) | |
| *B25J 11/00* | (2006.01) | |
| *H04R 1/02* | (2006.01) | |
| *G16Y 20/10* | (2020.01) | |
| *G10L 15/22* | (2006.01) | |

(52) U.S. Cl.
CPC ......... *B25J 13/003* (2013.01); *B25J 11/0005* (2013.01); *G06F 3/0488* (2013.01); *G16Y 20/10* (2020.01); *H04N 5/2253* (2013.01); *H04R 1/028* (2013.01); *G10L 15/22* (2013.01); *G10L 2015/223* (2013.01)

(58) Field of Classification Search
CPC ..... B25J 11/0005; B25J 13/003; G06F 3/013; G06F 3/04883; G06F 1/1694; G06F 3/0488; H04R 1/028; G16Y 20/10; H04N 5/2253; G10L 2015/226; G10L 15/22; G10L 2015/223
See application file for complete search history.

(56) References Cited

U.S. PATENT DOCUMENTS

| | | | | |
|---|---|---|---|---|
| 8,996,175 | B2 * | 3/2015 | Blumberg | ............ G06V 10/235 |
| | | | | 901/3 |
| 9,643,779 | B2 * | 5/2017 | Yamada | ................... B25J 5/007 |
| 9,926,136 | B2 * | 3/2018 | Yamada | ................. B25J 9/0003 |
| 10,071,892 | B2 * | 9/2018 | High | ........................ G01S 1/02 |
| 10,130,232 | B2 * | 11/2018 | Atchley | ............... B07C 5/3422 |
| 10,245,732 | B2 * | 4/2019 | Kondo | ................... G06V 20/52 |
| 10,286,548 | B2 * | 5/2019 | Komatsuzaki | ......... B25J 9/1682 |

(Continued)

FOREIGN PATENT DOCUMENTS

| | | |
|---|---|---|
| JP | 2007-156578 | 6/2007 |
| JP | 2008-246665 | 10/2008 |

(Continued)

*Primary Examiner* — Vinh T Lam
(74) *Attorney, Agent, or Firm* — Greenblum & Bernstein, P.L.C.

(57) ABSTRACT

A device communicates with a human through voice recognition of voice of the human. The device includes: a drive mechanism that drives the device; and a processor. The processor controls the drive mechanism to drive the device to a waiting place for the device to contact the human, and the waiting place is determined based on contact information that is history of contact between the device and the human.

21 Claims, 16 Drawing Sheets

(56) References Cited

U.S. PATENT DOCUMENTS

| | | | |
|---|---|---|---|
| 10,435,279 B2 * | 10/2019 | Taylor | G05D 1/0022 |
| 10,486,951 B2 * | 11/2019 | High | E01H 5/12 |
| 10,569,420 B1 * | 2/2020 | Cohen | B25J 13/084 |
| 10,706,448 B2 * | 7/2020 | Tanaka | G06Q 10/06398 |
| 10,815,104 B2 * | 10/2020 | Thompson | G05D 1/0214 |
| 10,836,041 B2 * | 11/2020 | Ichikawa | B25J 11/0015 |
| 10,898,999 B1 * | 1/2021 | Cohen | B25J 9/0003 |
| 11,145,294 B2 * | 10/2021 | Vescovi | G10L 15/1815 |
| 11,148,296 B2 * | 10/2021 | Breazeal | G10L 15/22 |
| 11,151,992 B2 * | 10/2021 | Cui | G06V 40/161 |
| 2008/0221730 A1 | 9/2008 | Sakata et al. | |
| 2019/0126484 A1 * | 5/2019 | Benaim | G06F 3/0484 |

FOREIGN PATENT DOCUMENTS

| | | | | |
|---|---|---|---|---|
| JP | 2017182334 A | * | 10/2017 | B25J 11/0005 |
| JP | 2017209736 A | * | 11/2017 | B25J 11/0005 |
| JP | 2019005842 A | * | 1/2019 | B25J 11/0005 |

* cited by examiner

FIG. 4
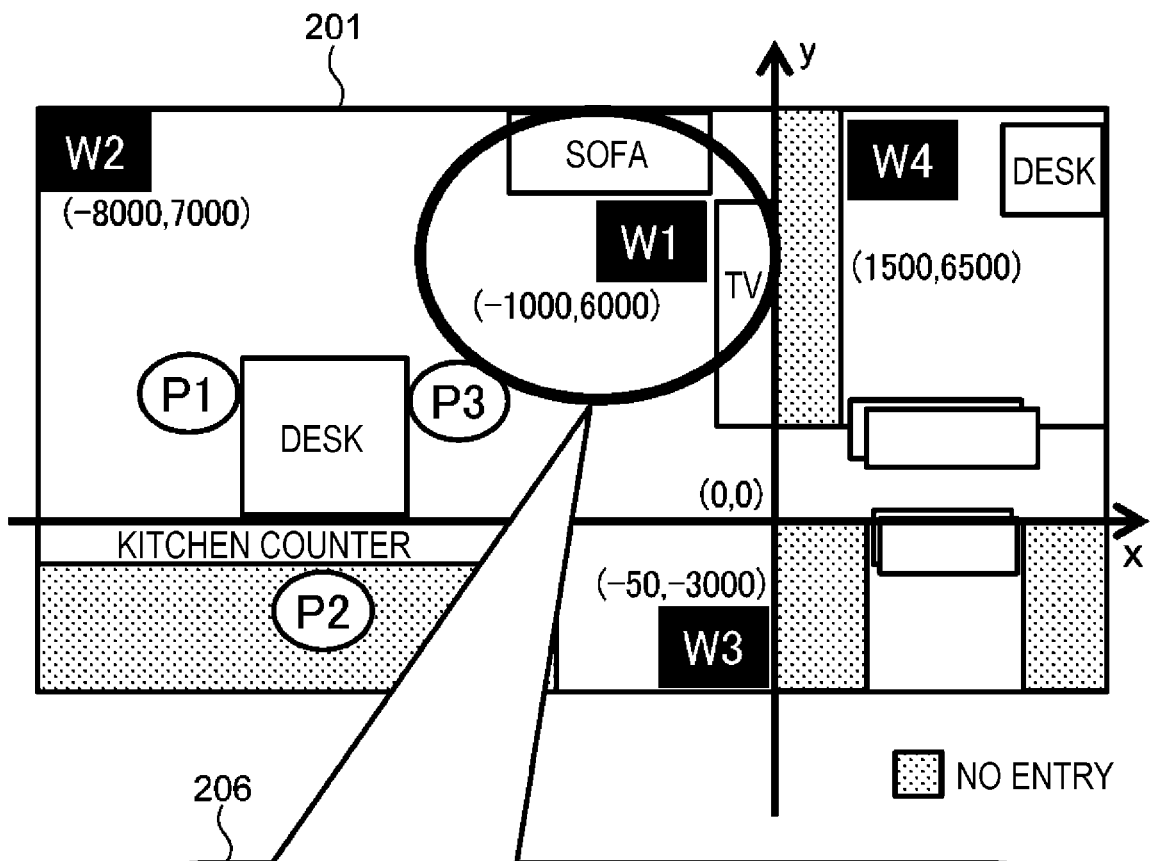
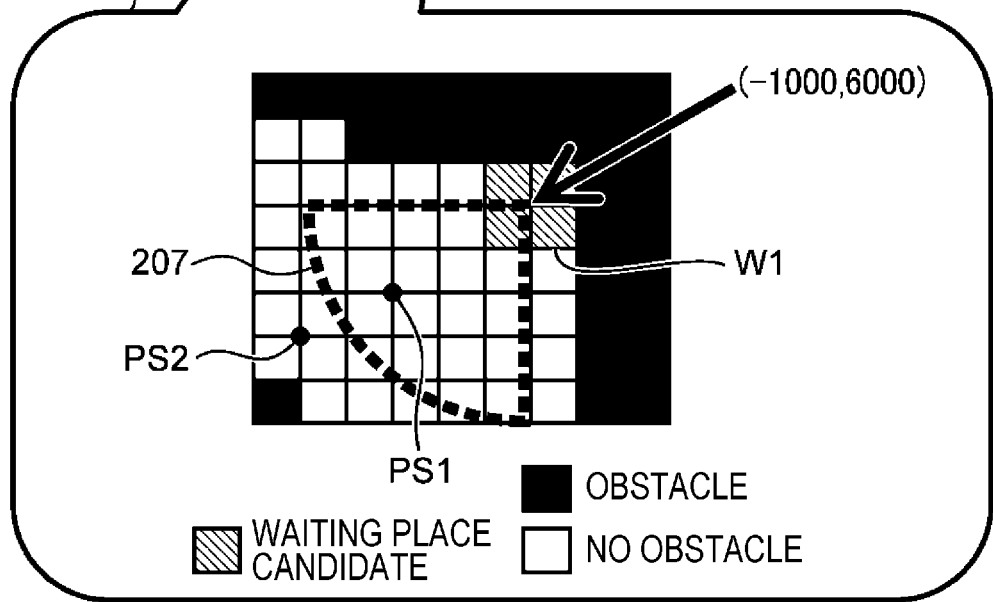

| WAITING PLACE CANDIDATE ID | WAITING PLACE CANDIDATE POSITION | FIRST THRESHOLD |
|---|---|---|
| W1 | X:-1000, Y:6000 | 150 cm OR LESS |
| W2 | X:-8000, Y:7000 | 200 cm OR LESS |
| W3 | X:-50, Y:-3000 | 150 cm OR LESS |
| W4 | X:1500, Y:6500 | 150 cm OR LESS |

| | TIME SEGMENT (401) | CONTACT DATE (402) | DAY OF WEEK (403) | CONTACT-START TIME POINT (404) | CONTACT TIME (SECONDS) (405) | WAITING PLACE CANDIDATE (406) | CONTACT POSITION (407) |
|---|---|---|---|---|---|---|---|
| 410 | T1 | 10/4 | THU | 6:00 | 30 | W1 | X:−1100 Y:5800 |
| 420 | T1 | 10/4 | THU | 7:30 | 300 | W2 | X:−7900 Y:6800 |
| 430 | T1 | 10/6 | SAT | 8:00 | 400 | W2 | X:−7800 Y:6900 |
| | ... | ... | ... | ... | ... | | |
| 440 | T6 | 10/5 | FRI | 18:30 | 360 | W2 | X:−7750 Y:6850 |
| 450 | T6 | 10/5 | FRI | 18:45 | 180 | W2 | X:−7700 Y:6880 |
| 460 | T6 | 10/6 | SAT | 18:30 | 400 | W1 | X: −1050 Y: 5900 |
| 470 | T8 | 10/5 | FRI | 23:00 | 3 | W1 | X:−1000 Y:−5850 |
| 480 | T8 | 10/3 | WED | 22:00 | 30 | W3 | X: −60 Y: −2700 |

| TIME SEGMENT | CORRESPONDING TIME |
|---|---|
| T1 | 6:00-9:00 |
| T2 | 9:00-11:00 |
| T3 | 11:00-13:00 |
| T4 | 13:00-15:00 |
| T5 | 15:00-17:00 |
| T6 | 17:00-20:00 |
| T7 | 20:00-22:00 |
| T8 | 22:00-24:00 |
| T9 | 24:00-2:00 |
| T10 | 2:00-6:00 |

| USER ID | NAME | HEIGHT (cm) | FACE DATA | ATTRIBUTE |
|---|---|---|---|---|
| P1 | YOSUKE | 180 | (REFERENCE TO FACE DATA) | PARENT |
| P2 | KUMI | 156 | (REFERENCE TO FACE DATA) | PARENT |
| P3 | AI | 107 | (REFERENCE TO FACE DATA) | CHILD |

1301 — USER ID
1302 — NAME
1303 — HEIGHT (cm)
1304 — FACE DATA
1305 — ATTRIBUTE

1310 — P1 row
1320 — P2 row
1330 — P3 row

| | 401 | 402 | 403 | 404 | 405 | 406 | 407 | 1208 | 1209 |
|---|---|---|---|---|---|---|---|---|---|
| | TIME SEGMENT | CONTACT DATE | DAY OF WEEK | CONTACT-START TIME POINT | CONTACT TIME (SECONDS) | WAITING PLACE CANDIDATE | CONTACT POSITION | CONTACT USER | CONTACT DESCRIPTION |
| 410 | T1 | 10/4 | THU | 6:00 | 30 | W1 | X:−1100 Y:5800 | P2 | NAME, STROKING |
| 420 | T1 | 10/4 | THU | 7:30 | 300 | W2 | X:−7900 Y:6800 | P3 | NAME, CHATTING |
| 430 | T1 | 10/6 | SAT | 8:00 | 400 | W2 | X:−7800 Y:6900 | P3 | NAME, HOLDING, SONG |
| | ... | ... | ... | ... | ... | | | ... | ... |
| 440 | T6 | 10/5 | FRI | 18:30 | 360 | W2 | X:−7750 Y:6850 | P3 | NAME, STROKING, QUIZ |
| 450 | T6 | 10/5 | FRI | 18:45 | 180 | W2 | X:−7700 Y:6880 | P3 | NAME, STROKING, CHATTING |
| 460 | T6 | 10/6 | SAT | 18:30 | 400 | W1 | X:−1050 Y:5900 | P3 | NAME, HOLDING, PICTURE BOOK |
| 470 | T8 | 10/5 | FRI | 23:00 | 3 | W1 | X:−1000 Y:−5850 | P1 | NAME |
| 480 | T8 | 10/3 | WED | 22:00 | 30 | W3 | X:−60 Y:−2700 | P2 | NAME, STROKING |

DEVICE, METHOD, AND PROGRAM

BACKGROUND

1. Technical Field

The present disclosure relates to a device that communicates with a human through voice recognition of voice of the human.

2. Description of the Related Art

Recent years have seen development of robots that behave so as not to disturb people in the vicinity thereof. For example, Japanese Unexamined Patent Application Publication No. 2007-156578 (hereinafter referred to as "Patent Document 1") discloses a method in which a life support robot that waits beside a user and that provides services, such as a life support service, to the user determines a waiting place where the robot does not disturb people. Specifically, this life support robot calculates a position that is located within a range where a human can hand an object to the robot relative to the current position of the human and that is where the degree of disturbing movement of the user is the lowest, based on a user stay map associated with stay times of the user, and sets the calculated position as the waiting place.

Also, Japanese Patent No. 4682217 (hereinafter referred to as "Patent Document 2") discloses a method for behavior control that does not require being aware of the presence of a moving body, such as a robot, except when a user pays attention to the moving body. Specifically, the moving body, such as a robot, sets an exclusive space of the user, based on information about the position and the direction of the user. The "exclusive space" as used in this case is a space that is a combination of space to which attention of the user is assumed to be directed on the basis of the current behavior of the user and personal space in social psychology. When the moving body, such as a robot, does not have information that is to be reported to the user, the moving body sets its target position or the like so that the target position is located outside of the area of the exclusive space.

SUMMARY

However, in Patent Documents 1 and 2, since a place where the moving body is likely to be contacted by a user is not designated as the waiting place, there is a problem in that it is difficult to increase the chance of being contacted by the user, such as being addressed by the user, while reducing cases in which voice recognition is executed during driving.

One non-limiting and exemplary embodiment provides a device and so on that increase the chance of being contacted by a user, while reducing cases in which voice recognition is executed during driving.

In one general aspect, the techniques disclosed here feature a device that communicates with a human through voice recognition of voice of the human. The device includes: a drive mechanism that drives the device; and a processor. The processor controls the drive mechanism to drive the device to a waiting place for the device to contact the human, and the waiting place is determined based on contact information that is history of contact between the device and the human.

According to the present disclosure, it is possible to increase the chance of being contacted by a user, while reducing cases in which voice recognition is executed during driving.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a view illustrating a map represented by map information according to the first embodiment of the present disclosure;

FIG. 5 is a table illustrating one example of a structure of a waiting place candidate table containing information regarding waiting place candidates;

FIG. 6 is a table illustrating one example of a data structure of a contact information database according to the first embodiment of the present disclosure;

FIG. 7 is a table illustrating one example of a data structure of a time segment database according to the first embodiment of the present disclosure;

FIG. 13 is a table illustrating one example of a structure of a person information database according to the second embodiment of the present disclosure;

FIG. 14 is a table illustrating one example of a data structure of a contact information database according to the second embodiment of the present disclosure;

Figure 1:
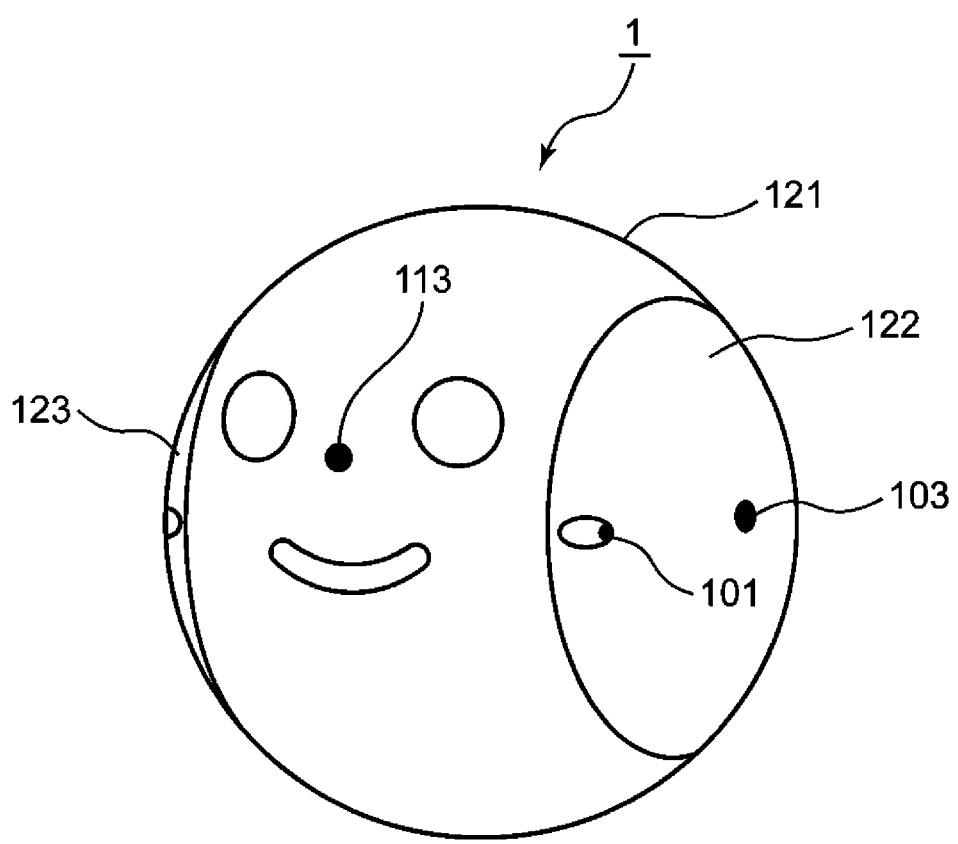
FIG. 1 is an external perspective view of a robot according to a first embodiment of the present disclosure.

DETAILED DESCRIPTION (Background From Which the Present Disclosure was Derived)

The present inventor has developed a robot that engages with a user through voice recognition to interpret speech of a user. Such a robot that performs voice recognition has a tradeoff relationship between the accuracy of voice recognition and driving of the robot. That is, when the robot performs voice recognition while driving, motor sound of the robot becomes noise to thereby reduce the accuracy of the voice recognition. Also, when the robot is controlled so as to stay at a waiting position as much as possible in order to prevent voice-recognition accuracy deterioration due to motor sound, there are cases in which the robot is rarely addressed by the user, depending on the waiting position. This may make it difficult to realize the robot's original purpose of engaging with the user.

Thus, behavior control on a robot that engages with a user requires control for increasing the chance of being contacted by the user, such as the chance of being addressed by the user, while reducing cases in which voice recognition is executed during driving. Meanwhile, a method in which the robot always follows a user, stops moving upon detecting voice, and performs voice recognition is also conceivable, but with such a method, the robot always chases around the user. In this case, since there is a concern that the user feels that the robot is disturbing or the robot cannot serve a plurality of users, contrivance is needed to determine the waiting place of the robot.

In each of Patent Documents 1 and 2, a scheme for determining the waiting place of the robot so as not to disturb a user has been proposed, as described above.

However, in the case of a robot that is used at home, a plurality of users may often be present in the same space, and a time and a place at which each user is likely to take an action of interacting with the robot are thought to differ depending on the user.

The "user's action of interacting with a robot" is hereinafter referred to simply as "contact". Specifically, examples of the contact include a calling action, a dialogue action, a physically touching action, such as stroking and holding, an eye-contacting action, a mutually smiling action, and an action in which a user and a robot execute play content, such as a quiz, a song, and read-aloud.

In Patent Document 1 described above, since a place where the stay time of a user is short is merely set as the waiting place where the life support robot provides a service to the user, a place where the robot is likely to be contacted depending on a day of the week or a time cannot be set as the waiting place.

Similarly, in Patent Document 2 described above, the behavior of the moving body, such as a robot, is merely controlled so that the moving body, such as a robot, does not enter the exclusive space of the user, except when the user pays attention to the moving body. Thus, a place where the robot is likely to be contacted depending on the day of the week, the time, and so on cannot be set as the waiting place.

Therefore, the technologies in Patent Documents 1 and 2 cannot reduce the driving time of the robot during contact with a user and cannot reduce a voice-recognition accuracy decline due to driving sound. In addition, since a place where the robot is likely to be contacted is not set as the waiting place, the chance of being contacted by the user decreases depending on the waiting place.

One non-limiting and exemplary embodiment provides a device that increases the chance of being contacted by a user, while reducing cases in which voice recognition is executed during driving.

One aspect of the present disclosure is directed to a device that communicates with a human through voice recognition of voice of the human, the device comprising:
    a drive mechanism that drives the device; and
    a processor, wherein the processor controls the drive mechanism to drive the device to a waiting place for the device to contact the human, and
    the waiting place is determined based on contact information that is history of contact between the device and the human.

According to this configuration, the device is driven to the waiting place determined based on the contact information, which is history of contact between the device and the human. Thus, a place where the device is likely to be contacted can be set as the waiting place. As a result, it is possible to reduce the driving time of the device during contact with a user, and it is possible to reduce a voice-recognition accuracy decline due to driving sound. Also, since a place where the device is likely to be contacted can be set as the waiting place, it is possible to increase the chance of being contacted by the user.

In the aspect described above, the contact information may be information in which time information and place information are associated with each other. The time information may include at least one of a time point at which the device contacted the human, a time segment in which the device contacted the human, a date on which the device contacted the human, and a day of week on which the device contacted the human. The place information may include at least one of a position where the device contacted the human and waiting place information regarding a waiting place where the device had waited when the device contacted the human.

According to this configuration, since the contact information is information in which the time information and the place information are associated with each other, a place where the device is likely to be contacted by the user can be more reliably set as the waiting place.

In the aspect described above, the contact information may be information in which the time information, the place information, and information regarding the human who contacted the device are associated with each other.

According to this configuration, since the contact information is information in which the information regarding the human who contacted the device is further associated with the time information and the place information, a place where the device is likely to be contacted by the user can be more reliably set as the waiting place, and a human who is highly likely to contact the device can be determined.

In the aspect described above, the waiting place may be a place determined based on the place information included in the contact information corresponding to at least one of a current time point, a current time segment, a current date, and a current day of week.

According to this configuration, since the waiting place is determined based on the place information included in the contact information corresponding to at least one of the current time point, the current time segment, the current date, and the current day of the week, a place where the device is likely to be currently contacted by the user can be designated as the waiting place.

In the aspect described above, in the waiting place determination based on the contact information, the contact information corresponding to a particular human pre-defined depending on at least one of a particular time segment and a particular day of week may be excluded.

There are cases in which it is desirable to restrict the time segment or the day of the week for contacting the device, depending on the human. Such cases include, for example, a case in which an infant contacts the device late at night. In this aspect, the contact information corresponding to a pre-defined particular human is excluded in the waiting place determination based on the contact information. Thus, even when the particular human has contacted the device in a particular time segment or on a particular day of the week in the past, information regarding the contact is excluded, and a waiting place in the particular time segment or on the particular day of the week is determined. As a result, it is possible to prevent the device from waiting at a place where a particular human is likely to contact the device in the particular time segment or on the particular day of the week. This makes it possible to prevent the particular human from contacting the device in the particular time segment or on the particular day of the week.

In the aspect described above, the processor may further control the drive mechanism to cause the device to wait at the determined waiting place or in a vicinity of the waiting place.

According to this configuration, since the device waits at the waiting place determined based on the contact information or in the vicinity of the determined waiting place, it is possible to increase the chance of being addressed by the user, while reducing cases in which voice recognition is executed during driving. Also, even when the device fails to move to the waiting place owing to an obstacle or the like, it is possible to move the device to the vicinity of the waiting place.

In the aspect described above, the device may further include:
a microphone that acquires sound in a vicinity of the device,
wherein the processor may further
control the microphone to acquire sound in the vicinity of the device at the determined waiting place while causing the device to wait, and
control, when a sound level of the acquired sound exceeds a threshold, the drive mechanism to drive the device to a place where the sound level is lower than or equal to the threshold.

According to this configuration, when the sound level in the vicinity of the determined waiting place exceeds the threshold, the device is driven to a place where the sound level is lower than or equal to the threshold. Thus, for example, even when sound that differs from voice of a human to be contacted and that has a sound level higher than the threshold occurs in the vicinity of the initially determined waiting place, the device can be caused to wait at the place where the sound level is lower than or equal to the threshold. As a result, for example, it is possible to prevent a decline in the accuracy of voice recognition on a human to be contacted, the decline being caused by noise provided by sound that differs from voice of the human to be contacted.

In the aspect described above, the device may further include:
a camera that acquires video in a vicinity of the device,
wherein the processor may further control the drive mechanism to turn the device to point the camera in a direction opposite to an obstacle, while causing the device to wait.

According to this configuration, since the device can wait at the waiting place while pointing the camera in a direction opposite to an obstacle, it is possible to prevent a situation in which an obstacle blocks the field of view of the camera to make the camera unable to photograph the human to be contacted. As a result, it is possible to enhance the recognition accuracy of the human to be contacted.

In the aspect described above, the device may further include a speaker that outputs voice,
wherein the processor may control the speaker to output voice for prompting the human so as to place, at a first place, a charger for charging the device, and
the first place may be a place that is included in the contact information and where the device has contacted the human for a longest period of time.

According to this configuration, voice for prompting placing the charger at the first place, which is the place where the device and the human have contacted for a longest period of time. Thus, the charger is placed at the first place, so that the waiting place can be used as a charging place, and the device can be charged efficiently.

In the aspect described above, the device may further include a display that displays information,
wherein the processor may control the display to display information for prompting the human so as to place, at a first place, a charger for charging the device, and
the first place may be a place that is included in the contact information and where the device has contacted the human for a longest period of time.

According to this configuration, the information for prompting placing the charger at the first place, which is a place where the device has contacted the human for a longest period of time, is displayed on the display. Thus, the charger is placed at the first place, so that the waiting place can be used as a charging place, and the device can be charged efficiently.

In the aspect described above, the processor may control the drive mechanism to cause the device to execute motion for prompting the human so as to place, at a first place, a charger for charging the device, and
the first place may be a place that is included in the contact information and where the device has contacted the human for a longest period of time.

According to this configuration, the device executes motion for prompting placing the charger at the first place, which is a place where the human has contacted the device for a longest period of time. Thus, the charger is placed at the first place, so that the waiting place can be used as a charging place, and the device can be charged efficiently.

In the aspect described above, the device may further include:
a microphone that acquires sound in a vicinity of the device,
wherein when it is determined based on the acquired sound that the human makes an affirmative response, the contact information may be updated.

According to this configuration, when a human makes an affirmative response to the device by speaking to the device, the contact information can be updated assuming that the human has contacted the device.

In the aspect described above, the device may further include:
a first sensor that detects that the device is physically touched by the human,
wherein when it is determined based on a result of the detection by the first sensor that the human makes an affirmative response, the contact information may be updated.

According to this configuration, when the human makes an affirmative response to the device by making a physical contact to the device, the contact information can be updated assuming that the human has contacted the device. Thus, it is possible to prevent a place where the human has made negative contact to the device from being designated as the waiting place.

In the aspect described above, when it is determined based on a result of the detection by the first sensor that the device is physically touched by the human, and it is determined that the device is raised by the human for merely moving the device, the contact information does not necessarily have to be updated.

According to this configuration, even in a case in which the human and the device contact each other, when this contact is a contact for merely moving the device and is not a contact for the human to interact with the device, it is possible to prevent information regarding the contact from being added as the contact information. Thus, for example, a place to which the human has merely moved the device can be prevented from being designated as the waiting place.

In the aspect described above, the waiting place information included in the contact information may indicate any of waiting place candidates pre-set in a predetermined space.

According to this configuration, a plurality of waiting place candidates pre-set in a predetermined space is included in the contact information as the waiting place information. Thus, an actual waiting place can be determined among the pre-set waiting place candidates, and the processing cost during the determination of the waiting place can be reduced.

In the aspect described above, the waiting place information included in the contact information may indicate any of waiting place candidates pre-set in a predetermined space, and a position of contact between the device and the human may be located within a predetermined range from a position of the waiting place candidate.

According to this configuration, of the waiting place candidates pre-set in the predetermined space, a position that is the closest to a position where the device has contacted the human is included in the contact information as the waiting place information. Thus, considering a layout or the like in the predetermined space, an actual waiting place can be determined among the waiting place candidates that are each appropriate as a waiting place, and the processing cost for determining the waiting place can be reduced.

In the aspect described above, the waiting place information included in the contact information may indicate any of waiting place candidates pre-set in a predetermined space, and the waiting place candidate where the device and the human have most commonly contacted each other in a time segment to which a current time point belongs may be designated as the waiting place.

According to this configuration, a place where the device is likely to be contacted by the user at the present time can be determined as the waiting place.

In the aspect described above, the waiting place candidate where the device and the human have most commonly contacted each other in the time segment to which the current time point belongs and on a day of week that is the same as a current day of week may be designated as the waiting place.

According to this configuration, a place where the device is likely to be contacted by the user can be designated as the waiting place.

In the aspect described above, the processor may determine the waiting place.

According to this configuration, the processor included in the device determines the waiting place. Thus, the waiting place can be determined quickly.

In the aspect described above, the device may further include a communication circuit connected to an external network, wherein the external server connected through the external network may determine the waiting place.

According to this configuration, the external server connected to the device through the external network determines the waiting place. Thus, it is possible to reduce processing load on the device.

In the above-described aspect, the device may be a robot.

According to this configuration, it is possible to provide a robot that can increase the chance of being contacted by a user, while reducing cases in which voice recognition is executed during driving.

The present disclosure can also be realized as a method and a program that implement each of the characteristic configurations included in such a device. Needless to say, such a program can be distributed via a computer-readable non-transitory storage medium, such as a compact disc read-only memory (CD-ROM), or a through a communications network, such as the Internet.

Embodiments of the present disclosure will be described below with reference to the accompanying drawings. In the drawings, the same constituent elements are denoted by the same reference numerals. The embodiments described below each represent a specific example of the present disclosure. Numerical values, shapes, constituent elements, steps, the order of steps, and so on described in the embodiments below are examples and are not intended to limit the present disclosure. Of the constituent elements in the embodiments described below, the constituent elements not set forth in the independent claims that represent the broadest concept will be described as optional constituent elements. The contents of all the embodiments may be combined with each other.

First Embodiment

First, details of an external appearance of a robot according to an embodiment of the present disclosure will be described with reference to FIGS. 1 and 2. FIG. 1 is an external perspective view of a robot according to a first embodiment of the present disclosure, and FIG. 2 is an internal perspective view of the robot according to the first embodiment of the present disclosure.

As illustrated in FIG. 1, a robot 1 (a device) includes a sphere-shaped main housing 121, a first spherical-cap portion 122, and a second spherical-cap portion 123. The main housing 121, the first spherical-cap portion 122, and the second spherical-cap portion 123 constitute a sphere as a whole. That is, the robot 1 has a spherical shape. The robot 1 contacts a user while moving two-dimensionally in a predetermined space. The first spherical-cap portion 122 and the second spherical-cap portion 123 are coupled to each other via a shaft (not illustrated) provided in the main housing 121. The shaft and the main housing 121 are not fixed to each other. Accordingly, the robot 1 moves forward or backward by rotating the main housing 121 about the shaft.

As illustrated in FIG. 1, the robot 1 has a speaker 113 in the main housing 121 and has a camera 101 and a microphone 103 in the first spherical-cap portion 122. The speaker 113 outputs voice of the robot 1. The camera 101 acquires video in the surrounding environment of the robot 1. The microphone 103 acquires sound in the surrounding environment of the robot 1. Although, in this aspect, the robot 1 has the speaker 113 in the main housing 121, the present disclosure is not limited thereto, and the robot 1 may have the speaker 113 in any of the main housing 121, the first spherical-cap portion 122, and the second spherical-cap portion 123. Although, in this aspect, the robot 1 has the camera 101 in the first spherical-cap portion 122, the present disclosure is not limited thereto, and the robot may have the camera 101 in at least one of the first spherical-cap portion 122 and the second spherical-cap portion 123. Adjusting the arrangement place of the camera 101 and the number of cameras 101 makes it possible to acquire video of 360-degree surroundings of the robot 1. Although, in this aspect, the robot 1 has the microphone 103 in the first spherical-cap portion 122, the present disclosure is not limited thereto, and the robot 1 may have the microphone 103 in any of the main housing 121, the first spherical-cap portion 122, and the second spherical-cap portion 123.

Figure 2:
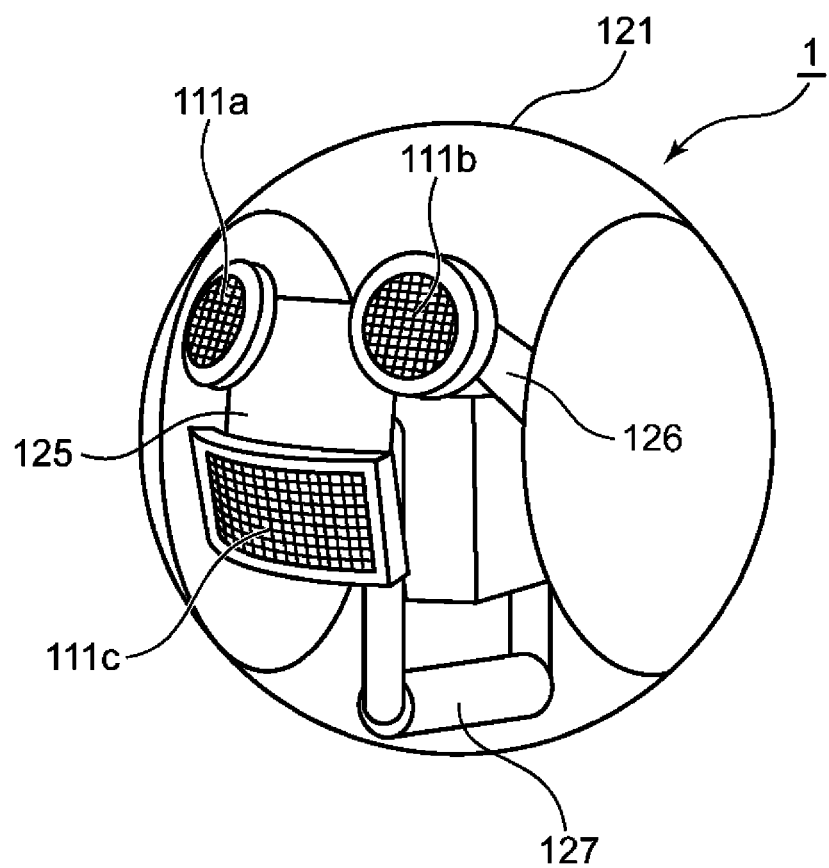
FIG. 2 is an internal perspective view of the robot according to the first embodiment of the present disclosure.

As illustrated in FIG. 2, the robot 1 includes a first display unit 111a, a second display unit 111b, and a third display unit 111c inside the main housing 121. The first display unit 111a, the second display unit 111b, and the third display unit 111c are attached to a fixed metal plate 125. The fixed metal plate 125 is attached to the shaft via arms 126. The first display unit 111a, the second display unit 111b, and the third display unit 111c are each constituted by, for example, a plurality of light-emitting diodes. The first display unit 111a, the second display unit 111b, and the third display unit 111c display a facial expression of the robot 1. Specifically, the first display unit 111a, the second display unit 111b, and the third display unit 111c individually control lighting of the light-emitting diodes to thereby display facial parts, for example, eyes and a mouth, of the robot 1, as illustrated in FIG. 1. In the example illustrated in FIGS. 1 and 2, the first display unit 111a displays an image of a right eye, the second display unit 111b displays an image of a left eye, and the third display unit 111c displays an image of a mouth. Images of the right eye, the left eye, and the mouth are emitted to outside through the main housing 121, which is made of a transparent or translucent member.

As illustrated in FIG. 2, the robot 1 has a weight 127 at a lower portion inside the main housing 121. Thus, the barycenter of the robot 1 is located below the center of the main housing 121. This makes it possible to stabilize the operation of the robot 1.

Figure 3:
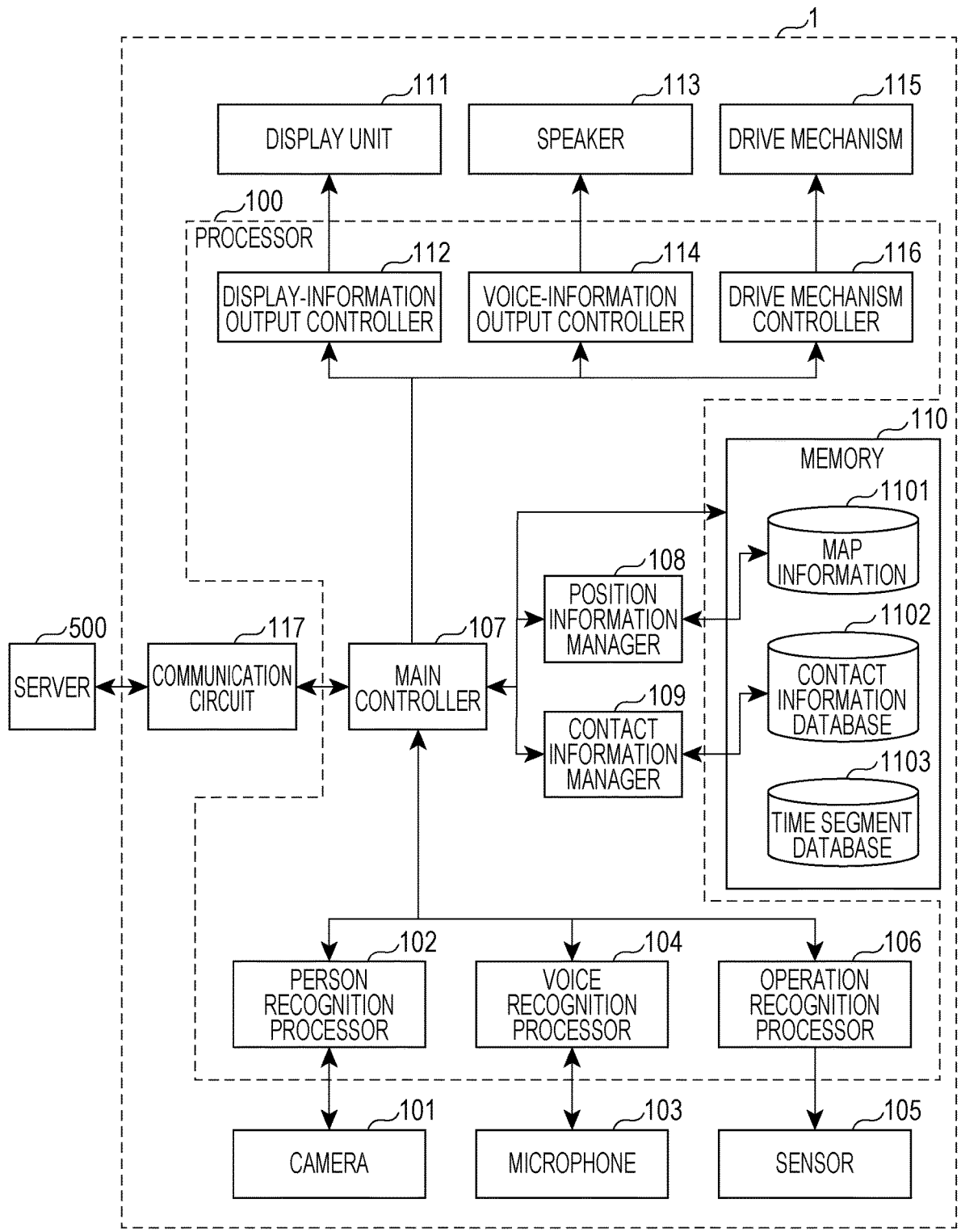
FIG. 3 is a block diagram illustrating the configuration of the robot according to the first embodiment of the present disclosure.

Next, details of an internal circuit of the robot 1 according to the embodiment of the present disclosure will be described with reference to FIG. 3. FIG. 3 is a block diagram illustrating the configuration of the robot according to the embodiment of the present disclosure.

As illustrated in FIG. 3, the robot 1 includes a processor 100, the camera 101, the microphone 103, a sensor 105, a display unit 111, the speaker 113, a drive mechanism 115, and a memory 110. The processor 100 is implemented by, for example, a central processing unit (CPU) or the like and includes a person recognition processor 102, a voice recognition processor 104, an operation recognition processor 106, a main controller 107, a position information manager 108, a contact information manager 109, a display-information output controller 112, a voice-information output controller 114, and a drive mechanism controller 116. The memory 110 is implemented by, for example, a nonvolatile semiconductor memory and includes map information 1101, a contact information database 1102, and a time segment database 1103.

The camera 101 acquires video in the surrounding environment of the robot 1. The microphone 103 acquires sound in the surrounding environment of the robot 1. The sensor 105 is constituted by, for example, an illuminance sensor, a gyro-sensor, an acceleration sensor, a geomagnetic sensor, a pressure-sensitive sensor, a proximity sensor, a fingerprint authentication sensor, a veins authentication sensor, and a laser range sensor. The operation recognition processor 106 uses information, obtained by the sensor 105, in order to recognize a user's operation on the robot 1 and objects that are present in the vicinity of the robot 1.

Based on the video acquired by the camera 101, the person recognition processor 102 recognizes the presence/absence of a user, the position of the user, the size of the user, the direction of the face, the orientation of line-of-sight, the type of facial expression, the user's posture (e.g., whether he or she is seated or standing), and attribute information of the user and manages a person recognition result. Examples of the type of facial expression include affirmative expressions, such as "smiling face" and "surprised face", and negative expressions, such as "sad face" and "reluctant face". The attribute information indicates, for example, a person identifier (ID), age bracket, and gender.

The voice recognition processor 104 executes voice recognition processing for recognizing the presence/absence of voice of a user, the type of voice of the user, and attribute information of the user, based on voice obtained by the microphone 103, and manages a recognition result. Examples of the type of voice include information indicating that a name is called, affirmative expressions, such as "I like." and "Let's play more.", and negative expressions, such as "I dislike." and "Go away." The attribute information indicates, for example, a person ID, age bracket, and gender.

Based on information obtained by the sensor 105, the operation recognition processor 106 recognizes a distance to an object present in the vicinity of the robot 1 (e.g., a distance to an obstacle or a distance to the user), the shape of the object, the type of operation, and the attribute information (e.g., a person ID and age bracket) and manages a recognition result of an operation performed by the user and the object present in the vicinity of the robot 1. Examples of the type of operation that is recognized include affirmative expressions, such as "touching", "stroking", and "holding", negative expressions, such as "hitting" and "flicking", and raising the robot 1.

Although the operation recognition processor 106 is described herein as recognizing the distance to the user, the person recognition processor 102 may recognize the distance to the user.

The map information 1101 is, for example, information regarding a map, such as a view of a layout in a building in which the robot 1 is present. FIG. 4 is a view illustrating the map represented by the map information 1101 according to the first embodiment of the present disclosure, the upper view being an overall view 201 of the map, and the lower view being an enlarged view 206 of a portion of the overall view 201. As illustrated in the overall view 201, two-dimensional coordinate axes denoted by an X-axis and a Y-axis are set in the map information 1101 and are used to represent each position on the map. The map information 1101 includes the positions of walls separating a plurality of rooms included in the building, the positions of furniture, such as desks and a sofa, placed in the building, the positions of electrical appliances, such as a television (TV), placed in the building, and so on. The map information 1101 further includes the positions of waiting place candidates W1, W2, W3, and W4 set by the robot 1.

As illustrated in the enlarged view 206, the map information 1101 is delimited by a plurality of blocks and indicates the presence/absence of an obstacle in each block. Examples of the obstacle includes the aforementioned walls separating the rooms, the furniture, and the electrical appliances. The map information 1101 further includes no-entry areas denoted by halftone dots, and the robot 1 is controlled so as not to enter the no-entry areas.

Based on a recognition result of the operation recognition processor 106, the position information manager 108 detects the presence/absence of an obstacle for each block, to thereby generate and update the map information 1101. For example, a localization and estimation technology, such as simultaneous localization and mapping (SLAM), can be utilized to generate and update the map information 1101.

The position information manager 108 sets waiting place candidates, for example, at the positions of corners or the like of obstacles indicated by the map information 1101, as in the waiting place candidate W1 in the enlarged view 206. The waiting place candidates are places preset by the robot 1 before a waiting place is determined, and the robot 1 determines an actual waiting place of the robot 1 among the waiting place candidates. In this example, each waiting place candidate is represented by an area constituted by four adjacent blocks. The center position of each waiting place candidate represents the position of the waiting place candidate. However, this is one example, and the number of blocks that constitute each waiting place candidate is not limited to four and may be three or less or may be five or more. Also, each waiting place candidate does not necessarily have to be represented by blocks and may be defined by the position or the area of the waiting place candidate. The reason why each waiting place candidate is represented by four blocks in the present embodiment is that the size of the robot 1 is assumed to be about four blocks.

When the robot 1 stops moving with its back turned to a corner of an obstacle, advantages that the robot 1 can easily acquire information in the room, can easily find a user, and can easily move to a contact place can be expected. Accordingly, the position information manager 108 may detect, from the map information 1101, a place such as a room corner where no large obstacle is present in front of the robot 1 when its back is turned to an obstacle and may set the place as a waiting place candidate.

While the robot 1 is in a freely behaving state and is roaming in the room freely (randomly), the position information manager 108 may generate the map information 1101 and set waiting place candidates. The "freely behaving state" as used herein refers to a state in which the robot 1 is not contacting a user. For example, the freely behaving state corresponds to a state in which a user or external equipment has not made a process execution reservation with the robot 1 and a state in which the amount of time until a reserved process is started is smaller than or equal to a threshold (e.g., 10 minutes). The "processes" in this case include, for example, a wake-up alarm function, a speech or behavior for prompting a daily habit, and play content, such as play with a quiz, play with a song, a picture book read-aloud, and so on.

Examples of the external equipment include portable information terminals, such as a tablet terminal and a smartphone. Upon receiving the user's instruction for the robot 1, the external equipment transmits the instruction to the robot 1. The robot 1 can directly receive a process execution instruction from the user through speech or the like and can also indirectly receive a process execution instruction from the user via the external equipment.

FIG. 5 is a table illustrating one example of a structure of a waiting place candidate table T5 containing information regarding the waiting place candidates. The waiting place candidate table T5 is included in the map information 1101. The waiting place candidate table T5 includes a "waiting place candidate ID" column 301, a "waiting place candidate position" column 302, and a "first threshold" column 303. Data are contained in these columns 301 to 303 in association with each other. The "waiting place candidate ID" column 301 contains identifiers of waiting place candidates. In this example, identifiers "W1" to "W4" of the waiting place candidates W1 to W4 illustrated in FIG. 4 are contained in the "waiting place candidate ID" column 301.

The "waiting place candidate position" column 302 contains the positions of waiting place candidates. In this example, the "waiting place candidate position" column 302 contains the positions of the waiting place candidates W1 to W4 set on the map illustrated in FIG. 4. In the example of a row 310, since the position of the waiting place candidate W1 has an X coordinate of "−1000" and a Y coordinate of "6000", "X: −1000, Y: 6000" is contained in the "waiting place candidate position" column 302.

The "first threshold" column 303 contains thresholds used to determine to which waiting place candidate the position of actual contact between the robot 1 and a user belongs. For example, in the case of the waiting place candidate W1, the position of the waiting place candidate for the robot 1 is "X: −1000, Y: 6000", and when a contact position is located within 150 cm from the position of the waiting place candidate W1, a contact at the contact position is regarded as a contact at the waiting place candidate W1. In the example in the enlarged view 206 in FIG. 4, a fan-shaped area having its center at a position (−1000, 6000) is defined as a threshold area 207 within a first threshold from the position of the waiting place candidate W1. In this case, since a contact position PS1 is located in the threshold area 207, a contact at the contact position PS1 is regarded as a contact at the waiting place candidate W1. On the other hand, since a contact position PS2 is located outside the threshold area 207, a contact at the contact position PS2 is not regarded as a contact at the waiting place candidate W1. Although, in the example illustrated in the enlarged view 206, the threshold area 207 does not include the blocks located along the obstacles, this is one example, and an area including blocks excluding obstacles included in a circle that has its center at the position of the waiting place candidate W1 and whose radius is equal to the first threshold may be simply set as the threshold area 207. Different values are set for the first threshold for respective waiting place candidates, depending on the surrounding environment, such as the placement of obstacles present in the vicinity of each waiting place candidate and the size of the room.

Thus, the map information 1101 includes information regarding the map showing the layout in the building which is illustrated in FIG. 4 and the waiting place candidate table T5 indicating information regarding the waiting place candidates W1 to W4. Although the waiting place candidate table T5 contains the items described above, the present disclosure is not limited thereto, and the waiting place candidate table T5 may contain another item regarding the map.

In addition, although the map information 1101 indicates the presence/absence of an obstacle and the presence/absence of a waiting place candidate in each block, the present disclosure is not limited thereto. For example, the map information 1101 may be information in which marks indicating the positions of the electrical appliances, the furniture, the waiting place candidates, and so on are displayed superimposed on the diagram of the layout in the building. The map information 1101 may also be map information pre-registered by the user, rather than being generated by the robot 1. In this case, the robot 1 may use the map information 1101 stored in the memory 110 or may use the map information 1101 created by an external server or another device connected through a network. In addition, the map information 1101 may be generated and updated by an external server or another device connected through a network, not by the robot 1.

FIG. 6 is a table illustrating one example of a data structure of the contact information database 1102 according to the first embodiment of the present disclosure. The contact information database 1102 is a database in which contact information that is history of contact between the robot 1 and the user is contained in its rows.

The contact information database 1102 includes a "time segment" column 401, a "contact date" column 402, a "day of week" column 403, a "contact-start time point" column 404, a "contact time" column 405, a "waiting place candidate" column 406, and a "contact position" column 407. The "time segment" column 401 contains information indicating in which time segment a contact between a user and the robot 1 occurred among pre-defined time segments. Each time segment is determined by comparing the contact-start time point contained in the column 404 with the time segment database 1103 illustrated in FIG. 7. FIG. 7 is a table illustrating one example of a data structure of the time segment database 1103 according to the first embodiment of the present disclosure. The time segment database 1103 contains one time segment in each row and has a "time segment" column 501 and a "corresponding time" column 502. The "time segment" column 501 contains identifiers of time segments, which are obtained by dividing one day into the time segments. The "corresponding time" column 502 contains a period from the start time point to the end time point of each time segment.

In the example illustrated in FIG. 7, time segments that are based on the life cycle of generally intended users are set. For example, a time segment T1 contained in a row 510 represents a time segment from 6:00 to 9:00, which is a period from waking up until going out. A time segment T3 contained in a row 530 represents a time segment from 11:00 to 13:00, which is a period for having lunch. The time segments may be set based on an estimation result of user behavior estimation performed for each home, may be time segments arbitrarily divided by a user according to his or her life cycle, or may be time segments divided simply at regular intervals. For example, the user behavior estimation is processing for estimating in which time segment and what the user does on the basis of information obtained by various sensors, such as cameras and microphones installed in the building and the camera 101 and the microphone 103 included in the robot 1. The user behavior estimation may be performed by the robot 1 or may be performed by an external server or the like connected to the robot 1 through a network. In the latter case, the robot 1 may obtain, through the network, the time segment database 1103 generated by the external server or the like.

Reference is made back to FIG. 6. The "contact date" column 402 and the "day of week" column 403 contain the dates and days of the week, respectively, when the robot 1 and the user contacted each other. The "contact-start time point" column 404 contains time points at which the robot 1 and the user contacted each other. The "contact time" column 405 contains a period of time from the contact-start time point contained in the column 404 to a corresponding contact-end time point. The "contact position" column 407 contains positions where the robot 1 and the user contacted each other. The "waiting place" column 406 contains identifiers of waiting place candidates corresponding to threshold areas 207 to which the contact positions contained in the column 407 correspond.

The contact information database 1102 and the time segment database 1103 are not limited to the items described above and may contain another item. The contact information database 1102 and the time segment database 1103 may be updated by another device or an external server connected through a network.

Reference is made back to FIG. 3. The position information manager 108 manages the map information 1101 stored in the memory 110. The position information manager 108 reads corresponding information from the map information 1101 in accordance with instructions from the main controller 107 and the contact information manager 109, which are described below, and outputs the read information to the main controller 107 and the contact information manager 109.

Specifically, the position information manager 108 manages the current position of the robot 1 in the map information 1101, based on a recognition result of the operation recognition processor 106, the recognition result being obtained via the main controller 107, and drive information of the robot 1 controlled by the drive mechanism controller 116, the drive information being obtained via the main controller 107. The drive information indicates how far and in which direction the robot 1 moved, and indicates, for example, the rotational speed of a motor and a turning angle of the robot 1.

The position information manager 108 also creates and updates the map information 1101, based on the recognition result of the operation recognition processor 106 and the drive information. More specifically, the position information manager 108 sets the positions of obstacles in the map information 1101 in accordance with an obstacle recognition result of the operation recognition processor 106 during driving of the robot 1. The position information manager 108 outputs the current position of the robot 1 in accordance with an instruction from the contact information manager 109.

The position information manager 108 also sets waiting place candidates in the map information 1101 in accordance with an instruction from the main controller 107. Specifically, based on the map information 1101, the position information manager 108 sets, as the waiting place candidates W1 to W4, places that are located at corners of obstacles and where the robot 1 can look around extensively in the room, as illustrated in FIG. 4.

In accordance with an instruction from the contact information manager 109, the position information manager 108 determines to which threshold area 207 for the waiting place candidates the current position of the robot 1 belongs and outputs, to the contact information manager 109, the identifier of the waiting place candidate corresponding to the threshold area 207 to which the current position is determined to belong.

When the current position of the robot 1 is located a second threshold or more away from the positions of all waiting place candidates, the position information manager 108 may obtain the positions of obstacles, such as walls, from the map information 1101 and may set a new waiting place candidate. When this processing is repeated, a waiting place candidate is eventually set at a place within the second threshold, whichever position the robot 1 is in the map indicated by the map information 1101.

Also, in order to set waiting place candidates and generate the map information 1101, the position information manager 108 may output, to the main controller 107, a drive request for driving the robot 1 to an unchecked area. Also, in accordance with an instruction from the main controller 107, the position information manager 108 outputs information indicating whether or not the current position of the robot 1 is located in a waiting place candidate designated by the main controller 107. In accordance with an instruction from the main controller 107, the position information manager 108 calculates a distance from the current position of the robot 1 or the position of a designated waiting place candidate to a charging stand and outputs the calculation result. One example of the position of the charging stand is a position indicated by "X=0, Y=0" in FIG. 4. The charging stand is a charging device for supplying electric power to the robot 1.

The contact information manager 109 manages the contact information database 1102 stored in the memory 110, and in accordance with an instruction from the main controller 107, the contact information manager 109 reads corresponding information from the contact information database 1102 and outputs the read information to the main controller 107. Specifically, upon obtaining, from the main controller 107, an instruction for recording contact information in response to the start of a contact between the robot 1 and the user, the contact information manager 109 records contact information, which is history of contact between the robot 1 and the user, to the contact information database 1102. In this case, the contact information manager 109 stores a contact date, the day of the week, and a contact-start time point when a contact occurs in the columns 402, 403, and 404, respectively, in the contact information database 1102.

The contact information manager 109 determines the time segment to which the contact-start time point belongs, in accordance with the time segment database 1103, and stores the determined time segment in the column 401 in the contact information database 1102. The contact information manager 109 also queries the position information manager 108 about the current position of the robot 1 during a contact and stores the obtained current position in the column 407 in the contact information database 1102 as the position of the contact between the robot 1 and the user.

The contact information manager 109 also queries the position information manager 108 about the waiting place candidate to which the contact position belongs and stores the identifier of the waiting place candidate in the column 406 in the contact information database 1102. In this case, the position information manager 108 may output, to the contact information manager 109, the identifier of the waiting place candidate corresponding to the threshold area 207 to which the current position of the robot 1 belongs. When the contact position does not belong to any of the threshold areas 207 corresponding to all waiting place candidates, the position information manager 108 may output, to the contact information manager 109, the identifier of the waiting place candidate located at a smallest distance from the contact position.

Also, upon obtaining, from the main controller 107, a recording instruction in response to the end of the contact, the contact information manager 109 calculates, as a contact time, a time that has elapsed from the contact-start time point contained in the column 404 and stores the contact time in the column 405 in the contact information database 1102.

Although, in the above description, the contact information manager 109 obtains, as a contact position, the current position of the robot 1 from the position information manager 108 when the robot 1 and the user start contacting each other and stores the contact position in the contact information database 1102, this is one example. When the contact ends, the contact information manager 109 may obtain the current position of the robot 1 from the position information manager 108 as a contact position and store the contact position in the contact information database 1102. Alternatively, the contact information manager 109 may collect, from the position information manager 108, pieces of position information of the robot 1 from a contact-start time point until a contact-end time point and store, in the contact information database 1102 as a contact position, the position where the robot 1 stayed for the longest period of time during the period of the contact. In this case, the contact information manager 109 may map the pieces of position information collected during the period of the contact onto the blocks set in the map information 1101 and store, in the contact information database 1102 as a contact position, a position corresponding to the block having the largest number of mapping points. This allows the contact information manager 109 to appropriately manage contact positions even when the robot 1 and the user move during the period of a contact.

Upon receiving a query about a waiting place from the main controller 107, the contact information manager 109 outputs the position of an optimum waiting place of the robot 1 at the current time point. Specifically, upon receiving a query about the waiting place from the main controller 107, the contact information manager 109 refers to the contact information database 1102 to determine a waiting place candidate where the robot 1 and the user most commonly contacted each other in the time segment to which the current time point belongs, and outputs the position of the waiting place candidate to the main controller 107 as the position of an optimum waiting place.

Referring to FIG. 6, for example, when the current time point is assumed to be 6:30, pieces of contact information in rows 410 to 430, which are contact information for the time segment T1 to which 6:30 belongs, are retrieved from the contact information database 1102. Since the number of pieces of contact information containing the waiting place candidate W2 is the largest in those retrieved pieces of contact information, the position of the waiting place candidate W2 is output as the position of the optimum waiting place. In this case, the contact time contained in the column 405 may be considered. For example, in the rows 410 to 430, the total contact time at the waiting place candidate W1 is 30 seconds, and the total contact time at the waiting place candidate W2 is 700 seconds (=300 seconds+400 seconds). Thus, since the total contact time at the waiting place candidate W2 is longer than the total contact time at the waiting place candidate W1, the waiting place candidate W2 may be designated as the optimum waiting place.

The contact information manager 109 may retrieve pieces of contact information in a most-recent certain period of time (e.g., one week, two weeks, or one month) from the contact information database 1102 by referring to the "contact date" column 402 in the contact information database 1102 and determine the optimum waiting place on the basis of the obtained pieces of contact information. Referring to FIG. 6, for example, when it is assumed that today is October 6, and the current time point is 6:30, pieces of contact information for the time segment T1 in the past one week on and before October 6 are retrieved from the contact information database 1102, and the optimum waiting place is determined on the basis of the obtained pieces of contact information. This makes it possible to, for example, flexibly deal with changes in a user's life situation, such as a child not going to school due to a long vacation.

Although, in the above description, the contact information manager 109 determines the optimum waiting place on the basis of the contact information for the time segment to which the current time point belongs, this is one example, and the current day of the week, in addition to the current time point, may also be considered to determine the optimum waiting place. For example, a waiting place candidate where the robot 1 and the user have most commonly contacted each other in the time segment to which the current time point belongs and on the same day of the week as the current day of the week may be designated as the waiting place. Referring to FIG. 6, for example, when it is assumed that the current time point is 6:30, and today's day of the week is Thursday, pieces of contact information for Thursday that is the same as today's day of the week and the time segment T1 to which the current time point belongs may be retrieved from the contact information database 1102, and the optimum waiting place may be determined on the basis of the obtained pieces of contact information.

Reference is made back to FIG. 3. The display unit 111 is constituted by, for example, a plurality of light-emitting diodes and displays display information of a facial expression of the robot 1. Specifically, the display unit 111 individually controls lighting of the plurality of light-emitting diodes to thereby display facial parts, for example, the eyes and the mouth, of the robot 1.

The display-information output controller 112 outputs, to the display unit 111, display information of a facial expression of the robot 1 which corresponds to a behavior control command transmitted from the main controller 107. The display unit 111 then outputs the facial expression of the robot 1 in accordance with the display information.

The voice-information output controller 114 outputs voice information of the robot 1 to the speaker 113 in accordance with a behavior control command output from the main controller 107. The speaker 113 then outputs the voice information of the robot 1.

The drive mechanism 115 is constituted by, for example, a plurality of motors, a frame, a plurality of gears, a drive belt, and a shaft and causes the robot 1 to operate. Referring to FIG. 2, the plurality of motors includes, for example, a first motor for rotating the main housing 121 to cause the robot 1 to travel, a second motor for rotating the weight 127 laterally relative to a traveling direction to cause the orientation of the robot 1 to incline laterally relative to the traveling direction, and a third motor for rotating the arms 126 about the shaft to incline the eyes and the mouth of the robot 1 upward or downward. The frame is suspended by the shaft to accommodate the plurality of motors, the gears, and the drive belt. The plurality of gears is rotated through engaging with the drive belt to transmit the torque of the third motor to the arms 126.

Specifically, in accordance with a control signal from the drive mechanism controller 116, the drive mechanism 115 drives the first to third motors to cause the robot 1 to travel, cause the robot 1 to turn, and incline the eyes and the mouth of the robot 1 upward or downward. The robot 1 turns to the right by inclining the weight 127 rightward, viewed from the rear side toward the front side of the robot 1, and traveling forward, and turns to the left by inclining the weight 127 leftward and traveling forward.

In accordance with a behavior control command transmitted from the main controller 107, the drive mechanism controller 116 outputs a control signal for controlling the drive mechanism 115 in the robot 1 to the drive mechanism 115. The drive mechanism 115 then causes the robot 1 to perform an operation according to the behavior control command.

The main controller 107 outputs, to the position information manager 108, a recognition result obtained from the operation recognition processor 106 and drive information of the robot 1 which is obtained from the drive mechanism controller 116, to thereby instruct the position information manager 108 to manage the position information of the robot 1 and create and update the map information 1101. The main controller 107 also instructs the position information manager 108 to check whether or not there is a waiting place candidate. Upon receiving an output indicating that there is no waiting place candidate from the position information manager 108, the main controller 107 instructs the position information manager 108 to create a waiting place candidate and to generate map information when the robot 1 is in the freely behaving state. Upon receiving a drive request from the position information manager 108 when the robot 1 is in the freely behaving state, the main controller 107 controls the drive mechanism controller 116 to drive the robot 1.

The main controller 107 determines the start and the end of a contact between the robot 1 and the user, based on at least one of recognition results respectively output from the person recognition processor 102, the voice recognition processor 104, and the operation recognition processor 106 and an execution status of content that the robot 1 provides to the user. The main controller 107 then instructs the contact information manager 109 to record contact information. The content is, for example, a program for causing the robot 1 to behave based on a scenario that the robot 1 has. Examples of the scenario include a quiz, a song, read-aloud, and so on.

Specifically, based on a recognition result obtained from the voice recognition processor 104, the main controller 107 determines whether or not there is a calling or dialogue action from the user. The main controller 107 also determines whether or not the user has performed a physically touching action, such as stroking, holding, or the like, based on a recognition result obtained from the operation recognition processor 106. Also, based on a recognition result obtained from the person recognition processor 102, the main controller 107 determines the user's face orientation, line-of-sight, and facial expression, such as smiling. Also, based on recognition results obtained from the person recognition processor 102, the voice recognition processor 104, and the operation recognition processor 106, the main controller 107 determines whether or not the content is executed and also determines the end of the content. Based on results of those determinations, the main controller 107 determines the start and the end of the contact between the robot 1 and the user.

Also, when the robot 1 is in the freely behaving state, the main controller 107 obtains, from the contact information manager 109, the position of the optimum waiting place where the robot 1 can easily contact the user and the amount of drive processing is small. The main controller 107 then outputs, to the drive mechanism controller 116, a behavior control command for causing the robot 1 to move to the position of the obtained optimum waiting place, thereby causing the robot 1 to move to the optimum waiting place. This allows the robot 1 to wait at a place where it is likely to be contacted by the user, depending on the current time point, the day of the week, and so on. Thus, it is possible to increase the possibility that the amount of drive of the robot 1 during contact with the user can be reduced, and it is possible to reduce a voice-recognition accuracy decline due to driving sound of the robot 1.

The main controller 107 generates a behavior control command, based on the information obtained from the position information manager 108 and the contact information manager 109 and outputs the behavior control command to the display-information output controller 112, the voice-information output controller 114, and the drive mechanism controller 116. Details of behavior control processing for generating the behavior control command are described later with reference to FIG. 8.

The main controller 107 also monitors whether or not there is a process involving starting of movement, for executing various types of behavior (e.g., singing a song, searching for a person, and finding and approaching a person), which are incorporated into an operation program for the robot 1, or for playing with the user. Upon detecting a process involving starting of movement, the main controller 107 performs, before starting the process, behavior control processing described below with reference to FIG. 8.

Also, when the robot 1 is in the freely behaving state, the main controller 107 generates a behavior control command for performing various types of behavior (e.g., self-talking, humming, driving slowly, driving wobbly, and stopping and looking around), which are incorporated into the operation program for the robot 1, so that the robot 1 is seen by the user as roaming. At this point in time, the main controller 107 performs the behavior control processing, described below with reference to FIG. 8, in order to set a waiting place candidate, which is a destination that the robot 1 reaches through roaming behavior.

Figure 8:
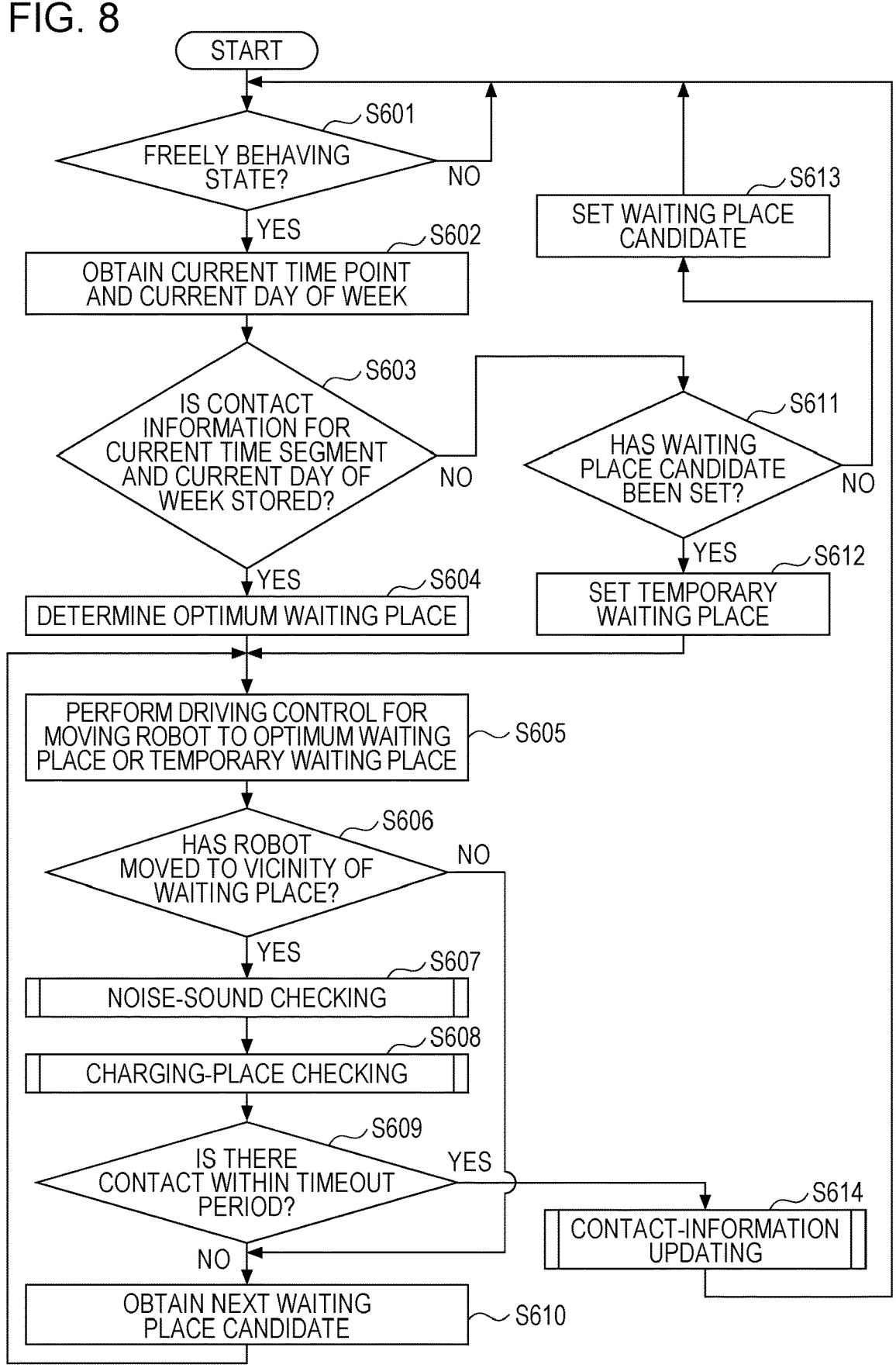
FIG. 8 is a flowchart illustrating one example of behavior control processing in the robot according to the first embodiment of the present disclosure.

Next, the behavior control processing in the robot 1 according to the first embodiment of the present disclosure will be described with reference to FIG. 8. FIG. 8 is a flowchart illustrating one example of behavior control processing in the robot 1 according to the first embodiment of the present disclosure.

First, the main controller 107 checks an internal state of the robot 1, the internal state being stored in the memory 110, to determine whether or not the robot 1 is in the freely behaving state (S601). If the robot 1 is not in the freely behaving state ("NO" in S601), the main controller 107 returns the flow to S601 without performing any processing. This is to give priority to a state in which the robot 1 and the user are contacting each other or a state in which the user or external equipment has made a process-execution reservation with the robot 1.

On the other hand, if the robot 1 is in the freely behaving state ("YES" in S601), the main controller 107 obtains the current time point and the current day of the week, for example, from a timer, which is not illustrated (S602). The main controller 107 queries the contact information manager 109 about whether or not contact information for contact in a time segment and on a day of the week that are respectively the same as the time segment (the current time segment) to which the obtained current time point belongs and the obtained current day of the week is stored in the contact information database 1102 (S603).

If contact information for a time segment and a day of the week that are respectively the same as the current time segment and the current day of the week is stored in the contact information database 1102 ("YES" in S603), the main controller 107 queries the contact information manager 109 about an optimum waiting place in the current time segment and on the current day of the week. The contact information manager 109 then retrieves, from the contact information database 1102, the contact information for the time segment and the day of the week that are respectively the same as the current time segment and the current day of the week, and determines an optimum waiting place, based on the retrieved contact information (S604). In this case, the contact information manager 109 refers to the "time segment" column 401 and the "day of week" column 403 in the contact information, stored in the contact information database 1102 illustrated in FIG. 6, to retrieve the contact information for the time segment and the day of the week that are respectively the same as the current time segment and the current day of the week. The contact information manager 109 then refers to the waiting place candidates contained in the column 406 in the retrieved contact information to designate, as an optimum waiting place, a waiting place candidate where the robot 1 has been most commonly contacted.

During the determination, there is a case in which contact information in which both the time segment and the day of the week match the current time segment and the current day of the week is not stored in the contact information database 1102 or a case in which the number of pieces of contact information stored in the contact information database 1102 is small (e.g., 5 or fewer). In such a case, the contact information manager 109 determines whether the current day of the week falls on a weekday or a holiday. When the current day of the week falls on a weekday, the contact information manager 109 may retrieve, from the contact information database 1102, contact information for weekdays in the same time segment as the current time segment to determine an optimum waiting place. On the other hand, when the current day of the week falls on a holiday, the contact information manager 109 may retrieve, from the contact information database 1102, contact information for holidays in the same time segment as the current time segment to determine an optimum waiting place. For example, the days of the week from Monday to Friday correspond to the weekdays, and for example, Saturdays, Sundays, and national holidays correspond to the holidays.

During the retrieval of the contact information from the contact information database 1102, the contact information manager 109 may exclude the contact information in which the contact time contained in the column 405 is shorter than or equal to a predetermined time (e.g., 5 seconds). In the example illustrated in FIG. 6, since the contact time in the contact information in a row 470 is not more than 5 seconds, this contact information is excluded from the contact information to be retrieved. In addition, during the retrieval of the contact information from the contact information database 1102, the contact information manager 109 may regard only the contact information in a most-recent certain period of time (e.g., one week) as the contact information to be retrieved, as described above.

On the other hand, if contact information in a time segment and on a day of the week that are respectively the same as the current time segment and the current day of the week is not stored in the contact information database 1102 ("NO" in S603), the main controller 107 queries the position information manager 108 about whether a waiting place candidate has been set (S611). If the position information manager 108 has set a waiting place candidate ("YES" in S611), contact information for a time segment and a day of the week that are respectively the same as the current time segment and the current day of the week is not stored in the contact information database 1102. Thus, the main controller 107 obtains, from the contact information manager 109, a waiting place candidate located at the smallest distance from the current position of the robot 1 and sets the obtained waiting place candidate as a temporary waiting place (S612).

On the other hand, if the position information manager 108 has not set a waiting place candidate ("NO" in S611), the main controller 107 instructs the position information manager 108 to set a waiting place candidate (S613). In this case, in order to set a waiting place candidate, the position information manager 108 outputs, to the main controller 107, a drive request for driving the robot 1 to an unchecked area or the like. In accordance with the drive request obtained from the position information manager 108, the main controller 107 generates a behavior control command for driving the robot 1 and outputs the behavior control command to the drive mechanism controller 116. Upon driving of the robot 1, the position information manager 108 generates map information 1101 for the unchecked area and also sets a waiting place candidate.

Next, the main controller 107 generates a behavior control command for moving the robot 1 to the optimum waiting place or the temporary waiting place and outputs the behavior control command to the drive mechanism controller 116 (S605).

Since the situation of a room in a home always changes depending on the user, the robot 1 may not be able to reach a set waiting place, owing to the presence of baggage placed on the floor and child toys scattered on the floor. Accordingly, the main controller 107 checks whether or not the robot 1 has moved to the vicinity of the set waiting place (S606).

In this case, the main controller 107 checks whether or not the robot 1 has moved to the waiting place that is a destination, based on the drive information of the robot 1 which is obtained from the drive mechanism controller 116, the current position of the robot 1 which is managed by the position information manager 108, and the position of the waiting place. For the checking, upon determining that it is difficult to travel any further on the basis of obstacle information obtained from the operation recognition processor 106 while traveling to the waiting place that is a destination, the main controller 107 queries the position information manager 108 about whether or not the current position of the robot 1 which is obtained from the position information manager 108 is in the threshold area 207 (see FIG. 4) corresponding to the waiting place that is a waiting place. Upon obtaining a determination result indicating that the current position of the robot 1 is in the threshold area 207 from the position information manager 108, the main controller 107 determines that the robot 1 has moved to the vicinity of the waiting place. On the other hand, upon obtaining a determination result indicating that the current position of the robot 1 is outside the threshold area 207, the main controller 107 determines that the robot 1 failed to move to the vicinity of the waiting place.

If the robot 1 has moved to the vicinity of the waiting place ("YES" in S606), the main controller 107 performs a noise-sound checking process for checking noise sound in the vicinity of the waiting place (S607). If the robot 1 has moved to the vicinity of the waiting place, the main controller 107 queries the position information manager 108 about a direction in which an obstacle is located relative to the robot 1, based on the map information 1101 obtained from the position information manager 108. The main controller 107 may then output, to the drive mechanism controller 116, a behavior control command for causing the robot 1 to turn so that the optical axis of the camera 101 points in a direction that is opposite to the direction in which the obstacle is located. For example, in the example of the waiting place candidate W1 corresponding to the corners of the obstacles, the waiting place candidate W1 being illustrated in FIG. 4, the robot 1 turns so that its back faces the obstacles. This makes it easier for the robot 1 to look around in the room, and thus advantages that the robot 1 can easily find a user and can easily move to a contact place can be expected.

Although, in the above description, the main controller 107 causes the robot 1 at a waiting place to turn in a direction with its back facing an obstacle, this is one example, and the main controller 107 may locate a past contact position of contact between the robot 1 and the user by referring to the contact information database 1102 and then cause the robot 1 to turn so that the optical axis of the camera 101 points to the contact position. This makes it easy for the robot 1 to move to a position where the robot 1 can easily contact the user (e.g., to a large space in a living room). In this case, the main controller 107 queries the contact information manager 109 about a position where the robot has most commonly contacted the user in the field of view of the camera 101 when the robot 1 is stationary with its back facing the obstacle and may points the optical axis of the camera 101 to the position. The contact information manager 109 may map the contact positions, contained in the column 407 in the contact information database 1102, to the blocks set in the map information 1101 and may output, to the main controller 107, the position of the block having the largest number of mapped positions in the field of view of the camera 101.

Figure 9:
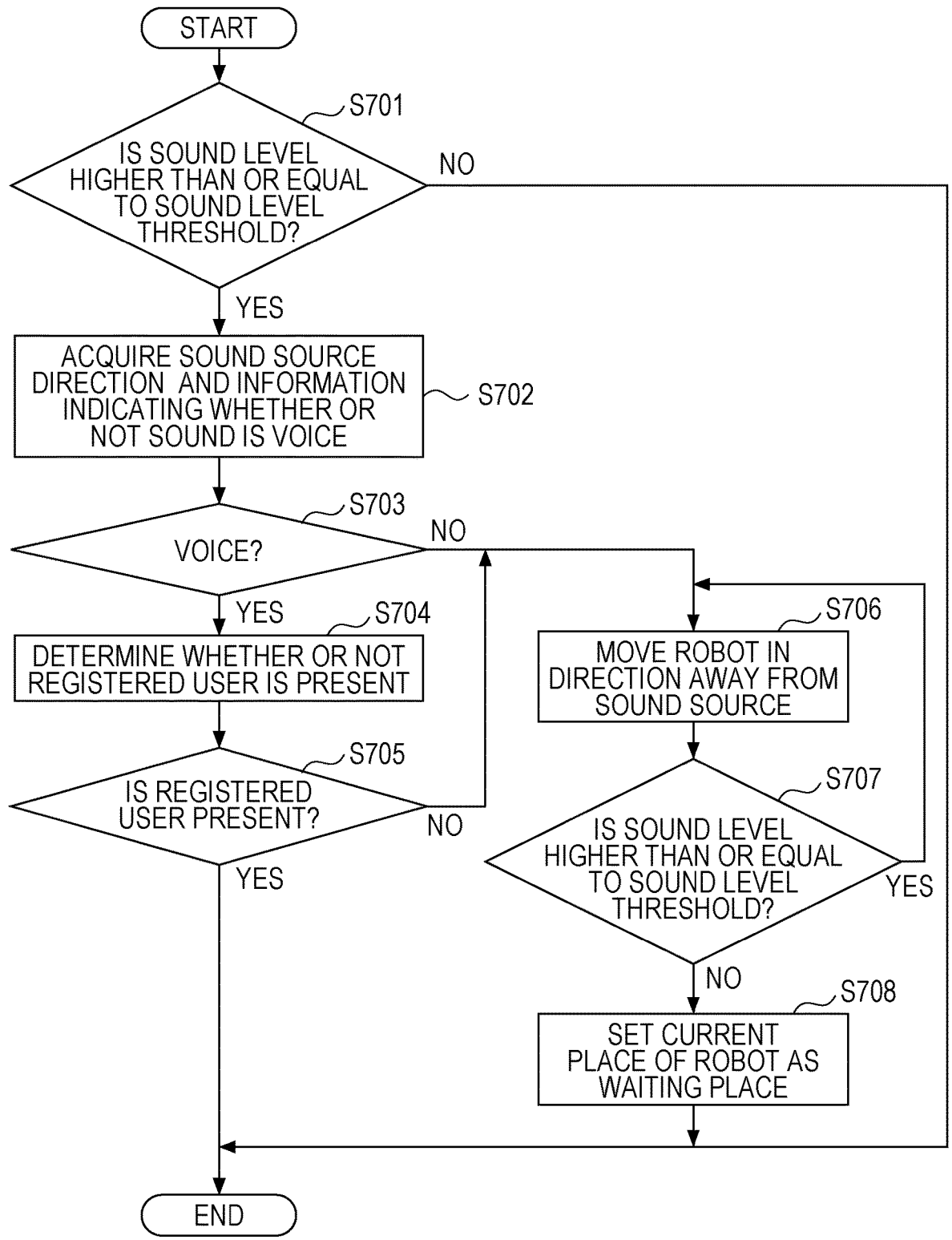
FIG. 9 is a flowchart illustrating one example of a noise-sound checking process.

Next, a description will be given of details of the noise-sound checking process in S607. FIG. 9 is a flowchart illustrating one example of the noise-sound checking process. In order to check noise sound in the vicinity of the waiting place, the main controller 107 queries the voice recognition processor 104 about whether or not the sound level of sound acquired by the microphone 103 is higher than or equal to a sound level threshold (S701). Upon obtaining a determination result indicating that the sound level of sound acquired by the microphone 103 is higher than or equal to the sound level threshold ("YES" in S701), the main controller 107 obtains, from the voice recognition processor 104, a sound source direction of the acquired sound and information indicating whether or not the sound is voice (S702). Based on the information obtained from the voice recognition processor 104 and indicating whether or not the sound is voice, the main controller 107 determines whether or not there is a possibility that the sound acquired by the microphone 103 includes voice of the user (S703). Upon determining that the sound acquired by the microphone 103 is voice ("YES" in S703), the main controller 107 generates a behavior control command for driving the robot 1 so that the optical axis of the camera 101 points in the sound source direction of the sound acquired by the microphone 103 and outputs the behavior control command to the drive mechanism controller 116.

Next, the main controller 107 checks with the person recognition processor 102 about whether or not a user who has been registered is present in the sound source direction (S704). If a registered user is present in the sound source direction ("YES" in S705), there is a possibility that the registered user is speaking, and thus the main controller 107 determines that the sound acquired by the microphone 103 is not noise sound, and then ends the noise-sound checking process. The registered user is, for example, a family member in a house where the robot 1 is.

On the other hand, if no registered user is present in the sound source direction ("NO" in S705), the main controller 107 determines that the sound acquired by the microphone 103 is voice output from a television, a radio, or the like, generates a behavior control command for driving the robot 1 in a direction away from the sound source, and outputs the behavior control command to the drive mechanism controller 116 (S706). In this case, for example, the main controller 107 may move the robot 1 a predetermined distance in the direction away from the sound source and within the threshold area 207 corresponding to the waiting place. In addition, in this case, the main controller 107 may set a larger predetermined distance as the sound level of the sound acquired by the microphone 103 increases.

In order to check noise sound at a place to which the robot 1 has moved, the main controller 107 re-obtains, from the voice recognition processor 104, a recognition result indicating whether or not the sound level of sound acquired by the microphone 103 is higher than or equal to the sound level threshold (S707). Upon determining that the sound level of the sound acquired by the microphone 103 is lower than the sound level threshold ("NO" in S707), the main controller 107 sets the current place of the robot 1 as the waiting place (S708).

On the other hand, upon determining that the sound level of the sound acquired by the microphone 103 is higher than or equal to the sound level threshold ("YES" in S707), the main controller 107 causes the robot 1 to move in a direction away from the sound source (S706).

If the sound acquired by the microphone 103 is not voice ("NO" in S703), the robot 1 is caused to move in a direction away from the sound source (S706).

The processes (S701 and S707) for determining whether or not the sound level of the sound acquired by the microphone 103 is higher than or equal to the sound level threshold may employ a method for checking whether or not an average sound level for a certain period of time (e.g., for 7 minutes) is higher than or equal to the sound level threshold. This makes it possible to prevent change of settings for the waiting place, the change being caused by instantaneous noise sound. In addition, while executing the noise-sound checking process, the main controller 107 may report a waiting place where noise sound is large to the position information manager 108. In this case, the position information manager 108 may reset waiting place candidates so that the reported waiting place is excluded from the waiting place candidates. The waiting place candidate resetting may be executed only when noise sound in the vicinity of a waiting place candidate in question is detected a plurality of times.

Although, in the present embodiment, the noise-sound checking process is performed at the timing of S607, the timing of the noise-sound checking process is not limited to this timing, and there is no problem even when the noise-sound checking process is performed at another timing (e.g., a timing at which the position information manager 108 sets a waiting place candidate for the first time).

Figure 10:
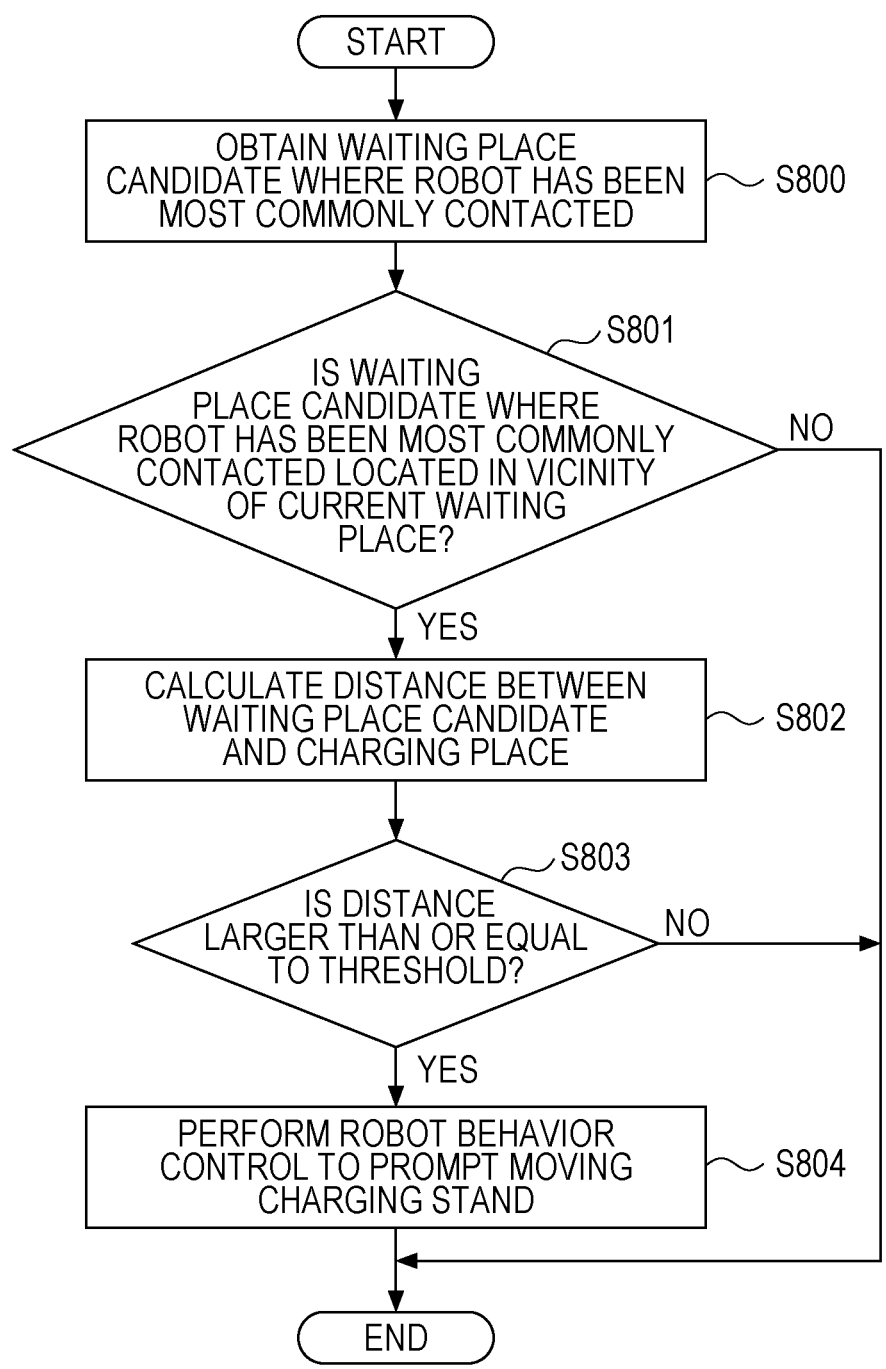
FIG. 10 is a flowchart illustrating one example of a charging-place checking process according to the first embodiment of the present disclosure.

Reference is made back to FIG. 8. In S608, the main controller 107 executes a charging-place checking process. FIG. 10 is a flowchart illustrating one example of a charging-place checking process according to the first embodiment of the present disclosure.

First, in S800, the main controller 107 obtains, from the contact information manager 109, a waiting place candidate where the robot 1 has been most commonly contacted in all the time segments and the days of the week. In this case, the contact information manager 109 may determine a waiting place candidate where the robot 1 has been most commonly contacted among the waiting place candidates stored in the contact information database 1102. For example, the contact information manager 109 may designate a waiting place candidate where the number of entries registered in the contact information database 1102 is the largest as a waiting place candidate where the robot 1 has been most commonly contacted or may calculate total contact times for respective waiting place candidates and designate the waiting place candidate where the total contact time is the largest as a waiting place candidate where the robot 1 has been most commonly contacted.

Next, the main controller 107 queries the position information manager 108 about whether or not the waiting place candidate where the robot 1 has been most commonly contacted in all the time segments and on all the days of the week, the waiting place candidate being obtained from the contact information manager 109, is located in the vicinity of the current waiting place (S801). In this case, the position information manager 108 may determine whether or not the position of the waiting place candidate where the robot 1 has been most commonly contacted belongs to the threshold area 207 corresponding to the current waiting place, as illustrated in FIG. 4.

Next, if the position of the waiting place candidate where the robot 1 has been most commonly contacted, the waiting place candidate being obtained in S800, is located in the vicinity of the current waiting place ("YES" in S801), the main controller 107 instructs the contact information manager 109 to calculate a distance between the position of the waiting place candidate where the robot 1 has been most commonly contacted and a charging place (S802). If the distance calculated by the contact information manager 109 is larger than or equal to a third threshold (e.g., 7 m) ("YES" in S803), the main controller 107 generates a behavior control command for prompting moving the charging stand and outputs the behavior control command to the display-information output controller 112, the voice-information output controller 114, and the drive mechanism controller 116 (S804).

In this case, the main controller 107 generates a behavior control command for turning on the plurality of light-emitting diodes at coordinates on the display unit 111 to represent, for example, a"~_~", shape which is a facial expression for asking for something, and outputs the behavior control command to the display-information output controller 112. In addition, the main controller 107 may generate a behavior control command for causing the robot 1 to utter a predetermined voice (e.g., "It would be nice if the charging stand is placed here", "It is far to the charging stand", or the like) and may output the behavior control command to the voice-information output controller 114. In addition, the main controller 107 may generate a behavior control command for causing the robot 1 to perform an action of shaking left and right as if it is asking for something or a behavior control command for causing the robot 1 to move with its face downward as if it is depressed and may output the behavior control command to the drive mechanism controller 116.

If the position of the waiting place candidate where the robot 1 has been most commonly contacted in all the time segments and on all the days of the week is not located in the vicinity of the current waiting place ("NO" in S801), the charging-place checking process ends.

Although, in the present embodiment, the charging-place checking process is performed at the timing of S608, the present disclosure is not limited thereto, and there is no problem even when the charging-place checking process is executed at another timing (e.g., a timing at which the number of pieces of contact information managed by the contact information manager 109 reaches a certain number).

Reference is made back to FIG. 8. In S609, the main controller 107 checks whether or not there is a contact between the robot 1 and the user within a timeout period (e.g., 20 minutes). In this case, the main controller 107 may check whether or not there is a contact, based on whether or not a recognition result indicating a contact with the user has been obtained from the person recognition processor 102, the voice recognition processor 104, and the operation recognition processor 106.

If the recognition result indicating a contact with the user is not received within the timeout period ("NO" in S609), the main controller 107 obtains, from the contact information manager 109, a waiting place candidate where the robot 1 has been the second most commonly contacted in the time segment and on the day of the week that are respectively the same as the current time segment and the current day of the week (S610). The main controller 107 then sets the obtained waiting place candidate as a next optimum waiting place, generates a behavior control command for causing the robot 1 to move to the position of the next optimum waiting place, and outputs the behavior control command to the drive mechanism controller 116 (S605). On the other hand, if the recognition result indicating a contact with the user is obtained within the timeout period ("YES" in S609), the main controller 107 executes a contact-information updating process (S614).

As described above, when the robot 1 is not contacted by the user within the timeout period after moving to a waiting place where the possibility of being contacted in the current time segment and on the current day of the week is the largest, the robot 1 moves to a waiting place where the possibility of being contacted is the second largest in the current time segment and on the current day of the week. This makes it possible to further increase the chance of being contacted by the user.

Figure 11:
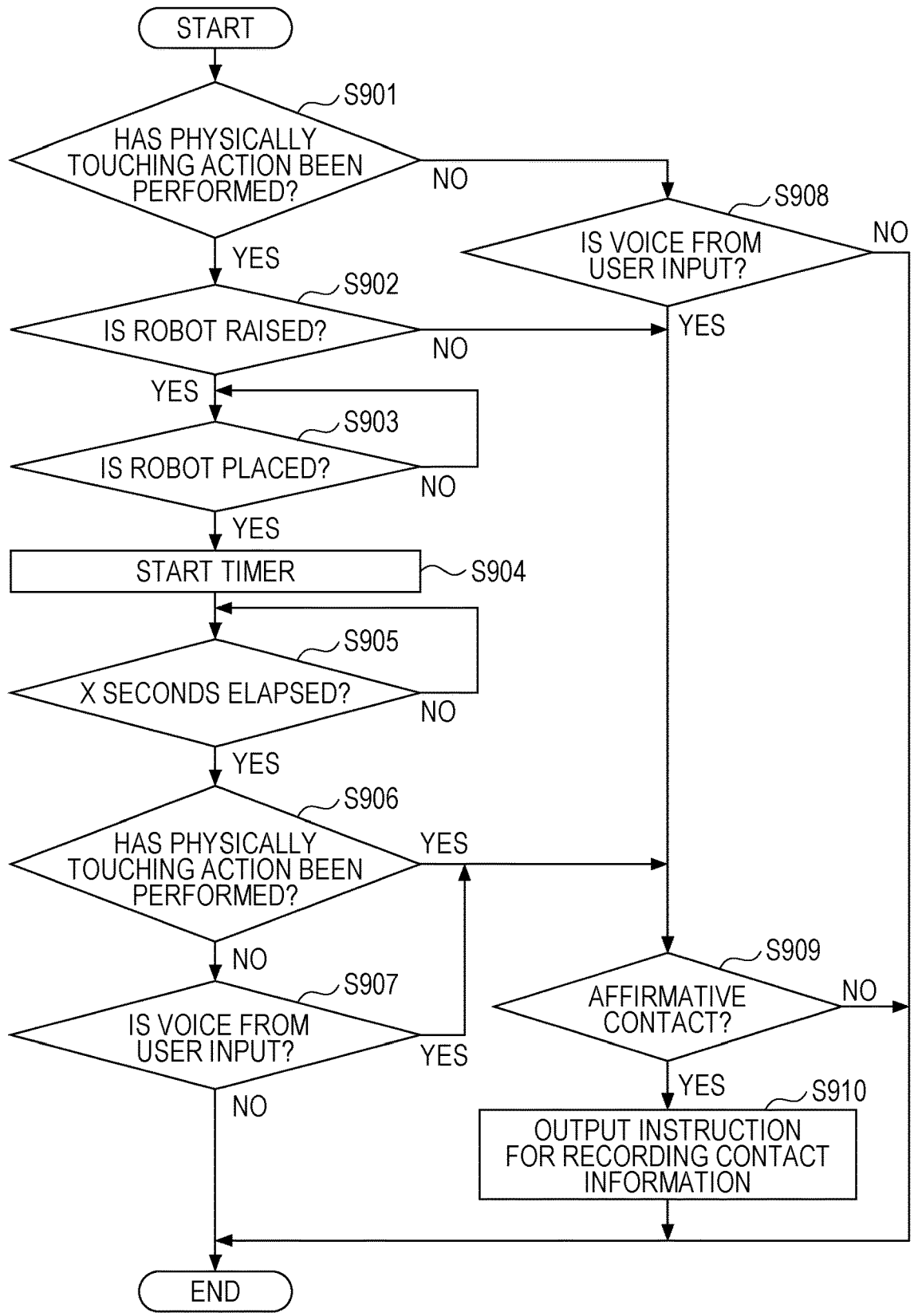
FIG. 11 is a flowchart illustrating one example of a contact-information updating process according to the first embodiment of the present disclosure.

FIG. 11 is a flowchart illustrating one example of the contact-information updating process according to the first embodiment of the present disclosure. The main controller 107 determines whether or not a physically touching action has been performed, based on whether or not a recognition result indicating that the user has performed a physically touching action on the robot 1 is obtained from the operation recognition processor 106 (S901).

If a physically touching action has not been performed ("NO" in S901), the main controller 107 determines whether or not voice from the user is input, based on whether or not a recognition result indicating that voice of the user has been recognized is obtained from the voice recognition processor 104 (S908). If voice from the user is input ("YES" in S908), the main controller 107 determines whether or not affirmative contact has been made by the user, based on whether or not the recognition result obtained from the voice recognition processor 104 indicates an affirmative expression (S909).

If affirmative contact has been made ("YES" in S909), the main controller 107 determines the start and the end of the contact and outputs, to the contact information manager 109, an instruction for recording contact information (S910). In response to the instruction, the contact information manager 109 records new contact information to the contact information database 1102.

On the other hand, if voice from the user is not input ("NO" in S908), or if voice obtained from the user is not an affirmative expression ("NO" in S909), the main controller 107 ends the contact-information updating process.

If the main controller 107 determines that a physically touching action has been performed ("YES" in S901), the main controller 107 determines whether or not the physically touching action is raising the robot 1 by the user, based on the recognition result obtained from the operation recognition processor 106 (S902).

For example, based on a waveform from the acceleration sensor included in the sensor 105, the operation recognition processor 106 may determine whether or not the physically touching action is raising the robot 1. In this case, the operation recognition processor 106 may determine whether or not the raising is performed, based on a waveform of at least a Z-axis component of X, Y, and Z-axis components obtained from the acceleration sensor. The X-axis is an axis in the left-and-right directions of the robot 1, the Y-axis is an axis in the front-and-back directions of the robot 1, and the Z-axis is an axis in the up-and-down directions of the robot 1. When the robot 1 is raised by the user, large sway in the Z-axis direction and sway in the X- and Y-axis directions are observed. Thus, by observing the waveform of at least the Z-axis component of the acceleration sensor, the operation recognition processor 106 can detect the raising of the robot 1.

Upon determining that the robot 1 is raised ("NO" in S902), the main controller 107 determines whether or not affirmative contact is made, based on the type of operation indicated by the recognition result obtained from the operation recognition processor 106 (S909). In this case, if the type of operation indicates an affirmative expression, the main controller 107 may determine that affirmative contact is made (YES in S909) and advance the process to S910. If the type of operation indicates a negative expression, the main controller 107 may determine that no affirmative contact is made (NO in S909) and end the contact-information updating process.

On the other hand, if it is determined that the robot 1 is raised ("YES" in S902), the operation recognition processor 106 determines whether or not the robot 1 is placed, based on the waveform of at least the Z-axis component of the acceleration sensor. Upon determining that the robot 1 is placed ("YES" in S903), the main controller 107 starts time measurement in a timer (S904) and waits for X seconds (e.g., 10 seconds) to elapse (S905). The process in S905 is a waiting process for determining whether the raising robot 1 by the user is raising for merely moving the position of the robot 1 or raising intended for affirmative contact. If the raising the robot 1 is raising intended for affirmative contact, the user is highly likely to perform a physically touching action on the robot 1 when about 10 seconds elapses after the robot 1 is placed. Accordingly, when X seconds elapses after the robot 1 is placed (YES in S905), the main controller 107 advances the process to S906.

Next, as in S901, the main controller 107 re-determines whether or not a physically touching action is performed (S906). If a physically touching action is performed ("YES" in S906), the main controller 107 determines whether or not affirmative contact is made, based on the type of operation indicated by the recognition result obtained from the operation recognition processor 106, as described above (S909).

On the other hand, if a physically touching action is not performed ("NO" in S906), the main controller 107 re-determines whether or not voice from the user is input, as in S908 (S907). If voice from the user is input ("YES" in S907), the main controller 107 determines whether or not affirmative contact is made, based on the type of voice indicated by the voice recognition result obtained from the voice recognition processor 104, as described above (S909).

On the other hand, if voice from the user is not received ("NO" in S907), the main controller 107 determines that the raising robot 1 by the user is raising for merely moving the robot 1 ("NO" in S909) and ends the contact-information updating process. In this case, contact information is not recorded to the contact information database 1102.

Although a method in which the contact information is not recorded when it is determined that raising the robot 1 is raising for merely moving the robot 1 has been described above, contact information regarding this raising may also be recorded to the contact information database 1102. In this case, the main controller 107 may control behavior of the robot 1 so as not to approach a place from which the robot 1 was moved.

Although, in the present embodiment, a recognition result indicating whether or not the user has performed a physically touching action on the robot 1, the recognition result being obtained from the operation recognition processor 106, and a recognition result of the user's voice, the recognition result being obtained from the voice recognition processor 104, are used in order to determine whether or not the user has made affirmative contact with the robot 1, the present disclosure is not limited thereto. For example, in addition to those recognition results, the main controller 107 may use a recognition result indicating the face orientation and the line-of-sight of the user, the recognition result being obtained from the person recognition processor 102, to determine whether or not the user has made affirmative contact with the robot 1.

As described above, according to the present embodiment, the robot 1 can determine a waiting place where it is more likely to be contacted in the current time segment and on the current day of the week and can wait at the waiting place. Thus, it is possible to reduce a driving time when the robot 1 contacts the user and it is possible to reduce a voice-recognition accuracy decline due to driving sound of the robot 1. In addition, since a place where the robot 1 is likely to be contacted by the user is set as a waiting place, it is possible to increase the chance of being contacted by the user.

Second Embodiment

Figure 12:
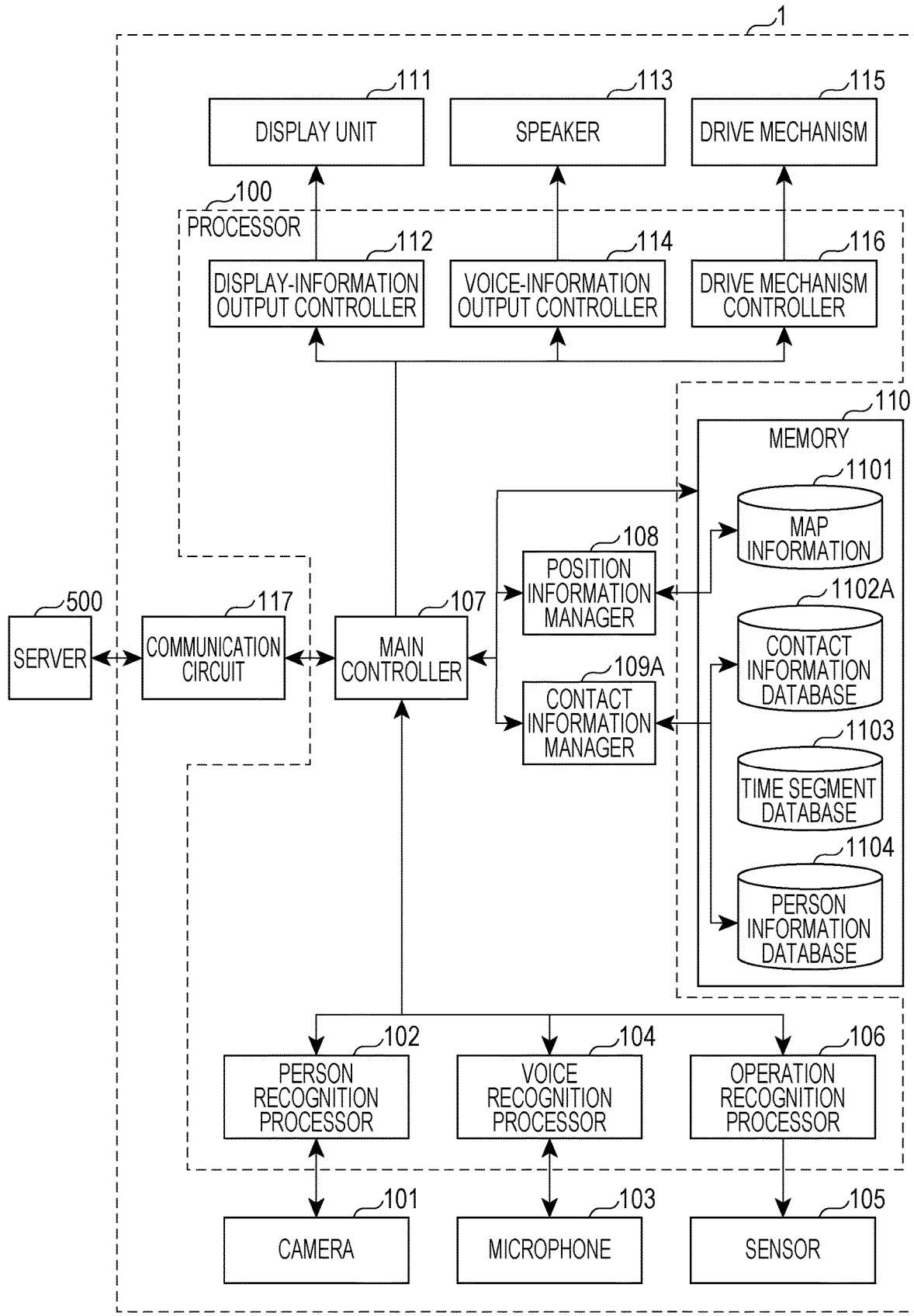
FIG. 12 is a block diagram illustrating a robot according to a second embodiment of the present disclosure.

Next, a second embodiment will be described with reference to FIG. 12. FIG. 12 is a block diagram illustrating a robot 1 according to the second embodiment of the present disclosure. In FIG. 12, constituent elements that are the same as those in FIG. 3 are denoted by the same reference numerals, and descriptions thereof are not given hereinafter. In addition, in the present embodiment, constituent elements that differ in functions from those in the first embodiment are denoted by reference numerals followed by letter A.

In the second embodiment, the memory 110 further includes a person information database 1104, compared with the first embodiment. The person information database 1104 stores user information of one or more users in rows thereof. A contact information manager 109A manages the person information database 1104 through a dialogue between the robot 1 and the user or through a user's operation on an external terminal.

FIG. 13 is a table illustrating one example of a structure of the person information database 1104 according to the second embodiment of the present disclosure. The person information database 1104 has a column 1301 in which user IDs for uniquely identifying users are contained, a column 1302 in which the names of people are contained, a column 1303 in which the heights of people are contained, a column 1304 in which reference information for face data of the users is contained, and a column 1305 in which attributes of the users are contained. Examples of the reference information for the face data include addresses at which the face data are stored, and examples of the face data include images of faces. Examples of the attributes of the users include a parent, a child, and so on.

The person information database 1104 is not limited to the items described above and may include another item. The person information database 1104 may employ a configuration in which it is updated by another device or a server connected through a network.

In the present embodiment, the contact information manager 109A further manages the person information database 1104 and further records, to a contact information database 1102A, user information of users who have contacted the robot 1 and contact descriptions of the users who have contacted.

FIG. 14 is a table illustrating one example of a data structure of the contact information database 1102A according to the second embodiment of the present disclosure.

Since the columns 401 to 407 are the same as those in the first embodiment, descriptions thereof are not given hereinafter. In the present embodiment, the contact information database 1102A further includes a "contact user" column 1208 and a "contact description" column 1209. The "contact user" column 1208 contains the users ID of users who have contacted the robot 1.

In accordance with an instruction from the main controller 107, the contact information manager 109A records contact information indicating a contact between the robot 1 and a user to the contact information database 1102A. For the recording, the contact information manager 109A obtains, from the main controller 107, the user ID of the user who is contacting the robot 1, the user ID being output from the person recognition processor 102 or the voice recognition processor 104, and stores the user ID in the contact information database 1102A. The contact information manager 109A also obtains, via the main controller 107, a contact description output from the voice recognition processor 104 or the operation recognition processor 106 and stores the contact description in the contact information database 1102A. The contact description includes, for example, information indicating that the name of the robot 1 is called and the type of voice, the information and the type being output from the voice recognition processor 104. The contact description includes, for example, an operation type, such as "touching, "stroking", "holding", "hitting", or the like, output from the operation recognition processor 106. The contact description further includes, for example, the type of content that the robot 1 managed by the main controller 107 executes during contact. The contact information database 1102A is not limited to the items described above and may include another item. The contact information database 1102A may also employ a configuration in which it is updated by another device or a server connected through a network.

Figure 15:
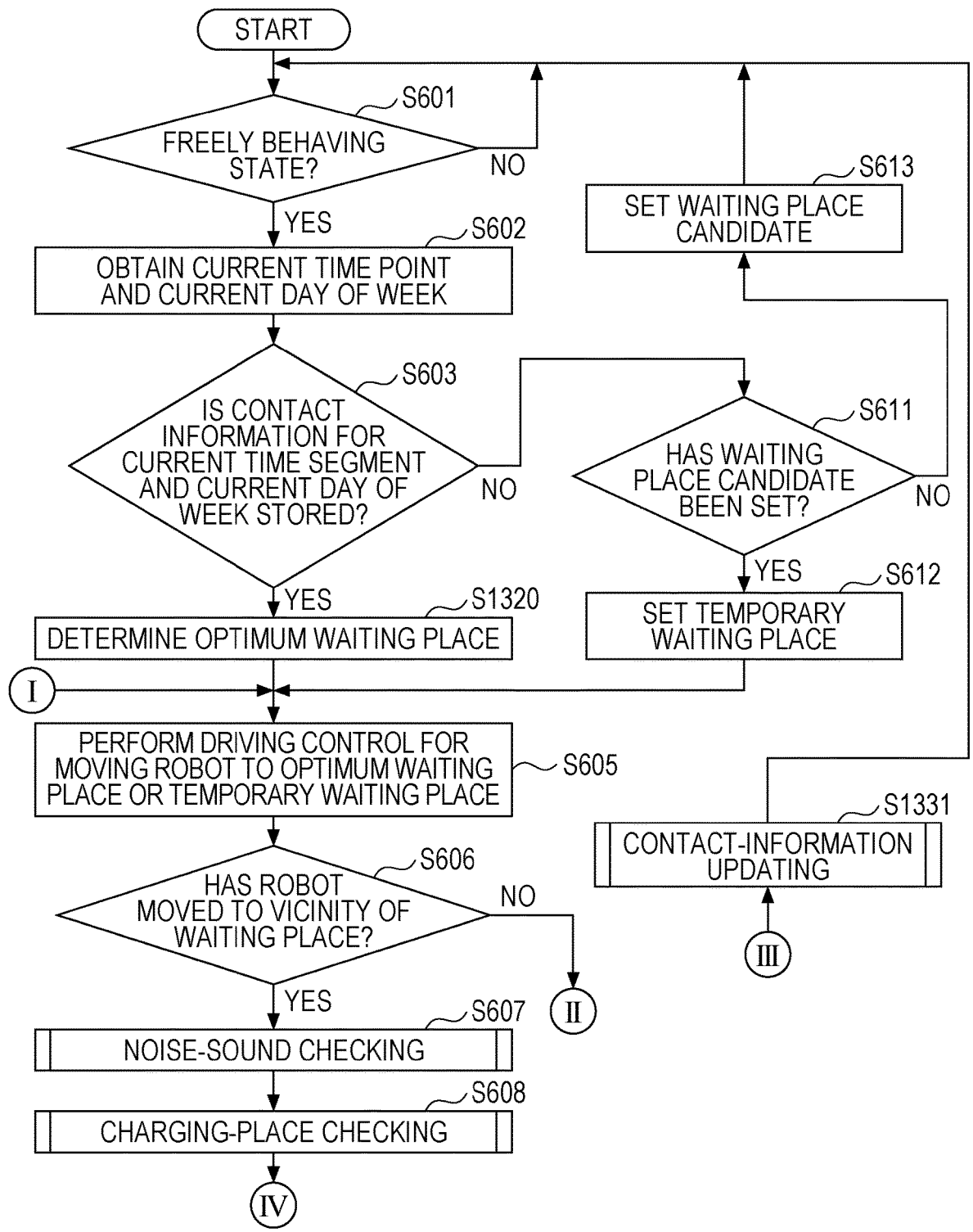
FIG. 15 is a flowchart illustrating one example of behavior control processing in the robot according to the second embodiment.
Figure 16:
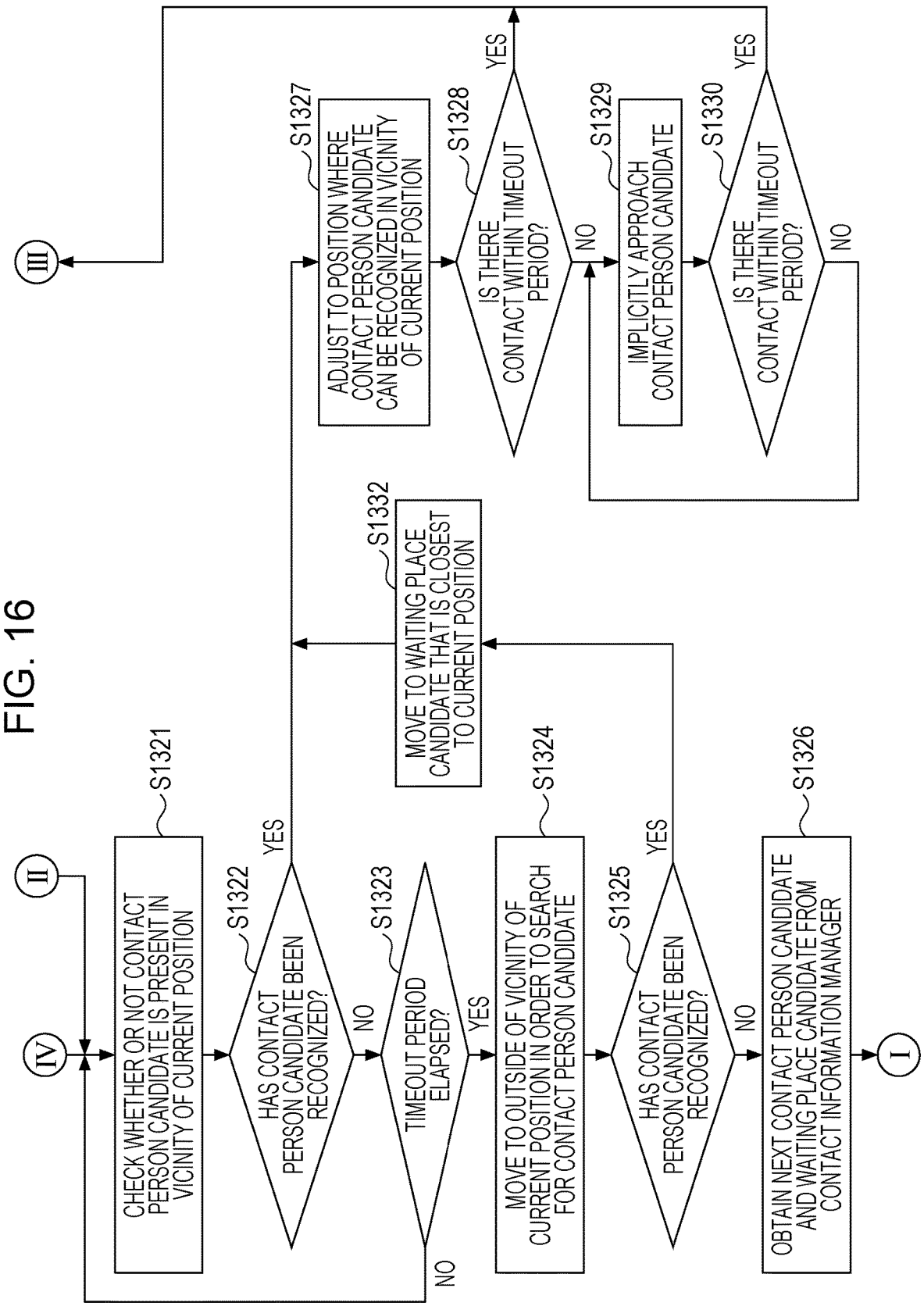
FIG. 16 is a flowchart illustrating one example of the behavior control processing in the robot according to the second embodiment.

Next, a description will be given of behavior control processing in the robot 1 in the second embodiment of the present disclosure. FIGS. 15 and 16 are flowcharts illustrating one example of behavior control processing in the robot 1 according to the second embodiment.

In FIGS. 15 and 16, details of processes S601 to S603, S605 to S608, and S611 to S613 are substantially the same as those of the processes denoted by the same reference numerals in FIG. 8, and thus descriptions thereof are not given hereinafter.

If contact information for a time segment and a day of the week that are respectively the same as the current time segment and the current day of the week is stored ("YES" in S603), the main controller 107 queries the contact information manager 109A about a contact person candidate who is likely to contact the robot 1, in addition to an optimum waiting place in the current time segment and on the current day of the week. The contact information manager 109A then retrieves, from the contact information database 1102A, the contact information for the time segment and the day of the week that are respectively the same as the current time segment and the current day of the week and determines the optimum waiting place and the contact person candidate, based on the retrieved contact information (S1320). In this case, the contact information manager 109A refers to the "time segment" column 401 and the "day of week" column 403 in the contact information database 1102A, illustrated in FIG. 14, to retrieve contact information in the time segment and the day of the week that are respectively the same as the current time segment and the current day of the week. The contact information manager 109A then designates, as the optimum waiting place, a waiting place candidate where the robot 1 has been most commonly contacted, based on the retrieved contact information, as in S604 in FIG. 8. At this point in time, the contact information manager 109A further designates, as the contact person candidate, a contact user who has most commonly contacted the robot 1, by referring to the column 1208 in the retrieved contact information. For example, the contact information manager 109A may aggregate the number of pieces of contact information for each contact user in the retrieved contact information and designate, as the contact person candidate, a contact user whose number of pieces of contact information is the largest.

However, this is one example, and the contact information manager 109A may determine the contact person candidate by applying weighting to the retrieved contact information, considering the contact descriptions contained in the "contact description" column 1209 and the contact times contained in the column 405.

For example, the contact information manager 109A gives a largest first weight value (which is an integer greater than or equal to 1) to the contact information including content, such as a quiz, a song, or the like in the "contact description" column 1209, gives a second weight value (which is an integer greater than or equal to 1 and is smaller than the first weight value) to the contact information including a chat or a contact action, such as stroking or holding, in the "contact description" column 1209, and gives a third weight value (=1) to the remaining contact information. The contact information manager 109A may further give scores according to the first to third weight values to the retrieved pieces of contact information, sum the scores for the pieces of contact information for each contact user, and designate the contact person candidate whose summed score is the largest as a contact user. In this case, the contact information manager 109A may further give scores according to the first to third weight values and the contact times to the retrieved pieces of contact information, sum the scores for the pieces of contact information for each contact user, and designate the contact user whose total score is the largest as the contact person candidate. Also, the contact information manager 109 may designate, as a contact place candidate where the robot 1 has been most commonly contacted, a contact place candidate corresponding to the contact user who is determined to have most commonly contacted the robot 1 in the corresponding time segment and day of the week.

The user may also set a request for restricting a particular user from contacting the robot 1 in a particular time segment, by using an external terminal, which is not illustrated.

For example, referring to FIG. 13, the attribute "child" is contained in the column 1305 for a user with user ID "P3". A user whose attribute is a parent may think that he or she wants to restrict contact between his or her child and the robot 1 in a night-time segment corresponding to time segments T7 to T10 illustrated in FIG. 7. In this case, the parent user can set a request for restricting the child user from contacting the robot 1 in the particular time segment. In this case, although the restriction is applied according to the time segment, this is an example, and the restriction may be applied according to at least one of the time segment and the day of the week.

When the request for the restriction is set, the contact information manager 109A excludes contact information including a particular attribute (e.g., child) in the column 1208 and including a particular time segment (e.g., time segments T7 to T10) in the column 401 from contact information to be retrieved during contact-information retrieval from the contact information database 1102A. This makes it possible to prevent a user having a restricted attribute from being designated as a contact person candidate in a particular time segment.

Next, if the robot 1 fails to move to the vicinity of the waiting place ("NO" in S606), the main controller 107 checks whether or not the contact person candidate is present in the vicinity of the current position of the robot 1 (S1321). In this case, in order to search for the contact person candidate, the main controller 107 generates a behavior control command for turning the robot 1, outputs the behavior control command to the drive mechanism controller 116, and checks a user recognition result output from the person recognition processor 102 during the turning.

It is desirable that the main controller 107 set the behavior control command so that the turning is initially started in a direction in which the camera 101 points in a direction opposite to a direction (e.g., a direction facing a wall) in which the robot 1 moves to the waiting place, which is a destination. This allows the robot 1 to check the presence of the contact person candidate, starting in a direction in which a contact person candidate is highly likely to be present.

If the robot 1 has moved to the vicinity of the waiting place ("YES" in S606), the main controller 107 also performs the processes S607 and S608 and then performs a process in S1321 for checking whether or not the contact person candidate is present in the vicinity of the current position.

Next, if the main controller 107 obtains a recognition result indicating that the contact person candidate has been recognized from the person recognition processor 102 ("YES" in S1322), the main controller 107 causes the robot 1 to wait while continuously recognizing the contact person candidate by adjusting the position of the robot 1 to a position where particularly the contact person candidate can be recognized in the vicinity of the current position (S1327). In this case, the vicinity of the current position corresponds to an area in a certain range from the current position, and when the robot 1 has moved to the vicinity of the waiting place, the vicinity of the current position corresponds to the threshold area 207 corresponding to the waiting place. Accordingly, the main controller 107 adjusts the position of the robot 1 within the area of the certain range from the current position. The position where particularly the contact person candidate can be recognized is, for example, a position where the front side or the camera 101 of the robot 1 faces the contact person candidate.

In this case, the main controller 107 may generate a behavior control command for causing the robot 1 or the camera 101 to operate while always following the contact person candidate or may cause the person recognition processor 102 to execute processing for checking the contact person candidate at regular intervals (e.g., every 3 minutes). The main controller 107 may also generate a behavior control command for causing the robot 1 to move within a range in which it can check the contact person candidate during waiting without causing the robot 1 to continuously looking at the contact person candidate or may generate a behavior control command for causing the robot 1 to speak.

On the other hand, if the main controller 107 fails to obtain a recognition result indicating that the contact person candidate has been recognized from the person recognition processor 102 ("NO" in S1322), the main controller 107 continues the processing for checking the presence/absence of the contact person candidate until a timeout period (e.g., 20 minutes) elapses, while turning the robot 1 in a direction opposite to obstacles, such as a wall, in the vicinity of the current position, based on the map information 1101 ("NO" in S1323, S1321, and S1322).

On the other hand, if the timeout period elapses ("YES" in S1323), the main controller 107 generates a behavior control command for causing the robot 1 to travel at outside of the vicinity of the current position in order to search for the contact person candidate (S1324) and outputs the behavior control command to the drive mechanism controller 116. In this case, for example, the main controller 107 may generate a behavior control command for causing the robot 1 to travel around in the same room. In this case, rather than searching for the contact person candidate determined in S1320, the main controller 107 may retrieve, from the contact information database 1102A as contact person candidates, a plurality of users whose probabilities of having contacted the robot 1 in the time segment and on the day of the week that are respectively the same as the current time segment and the current day of the week are larger than or equal to a certain threshold (e.g., 30% or more) and may search for any of the retrieved contact person candidates. The "vicinity of the current position" refers to the threshold area 207 corresponding to the waiting place, when the robot 1 has moved to the vicinity of the waiting place, and refers to an area in the certain range from the current position, when the robot 1 fails to move to the vicinity of the waiting place.

If the main controller 107 obtains a recognition result indicating that any of the contact person candidates has been recognized from the person recognition processor 102 ("YES" in S1325), the main controller 107 obtains, from the position information manager 108, a waiting place candidate that is the closest to the current position of the robot 1, generates a behavior control command for causing the robot 1 to move to the position of the closest waiting place candidate, while continuously recognizing the contact person candidate, and outputs the behavior control command to the drive mechanism controller 116 (S1332). The main controller 107 then advances the process to S1327.

If the robot 1 becomes unable to recognize the contact person candidate while moving to the waiting place candidate, the main controller 107 may obtain, from the position information manager 108, the position of a wall side that is the nearest from the current position, and set the obtained position as a new waiting place candidate. Then, the main controller 107 may generate a behavior control command for causing the robot 1 to turn so that the robot 1 or the camera 101 points in a direction opposite to the wall and cause the robot 1 to wait. This allows the robot 1 to wait at the wall side where it does not disturb another user, while checking the contact person candidate. In this case, a method for recognizing a face by using the camera 101 may be employed to recognize the contact person candidate, a method for tracking feature points or the like of the contact person candidate after recognizing the contact person candidate may be employed, and the robot 1 does not necessarily have to face the contact person candidate.

On the other hand, if the main controller 107 fails to obtain a recognition result indicating that a contact person candidate has been recognized from the person recognition processor 102 ("NO" in S1325), the main controller 107 obtains, from the contact information manager 109A, a contact person candidate who has the second highest possibility of contacting the robot 1 in the current time segment and on the current day of the week and a waiting place candidate (S1326). In this case, the contact information manager 109A may retrieve contact information for the time segment and the day of the week that are respectively the same as the current time segment and the current day of the week, designate a contact user having the second largest number of contacts with the robot 1 as a next contact person candidate, based on the retrieved contact information, and determine a waiting place candidate where the contact person candidate has most commonly contacted the robot 1 as a next waiting place candidate.

Next, during waiting, the main controller 107 checks whether or not there is contact from the user within a timeout period (e.g., 20 minutes) (S1328). If there is contact from the user ("YES" in S1328), the main controller 107 executes a contact-information updating process (S1331). The contact-information updating process in S1331 is the same as that in the first embodiment, except that the target to be updated is the contact information database 1102A.

On the other hand, if there is no contact from the user within the timeout period ("NO" in S1328), the main controller 107 generates a behavior control command for causing the robot 1 to implicitly approach the contact person candidate. For example, if the person recognition processor 102 detects that the contact person candidate looks at the robot 1, the main controller 107 generates, for example, a behavior control command for turning on the plurality of light-emitting diodes on the display unit 111 which are located at coordinates at which a shape "ˆ ˆ", which is a smiley-face expression, can be represented and outputs the behavior control command to the display-information output controller 112. Alternatively, the main controller 107 may generate a behavior control command for causing the robot 1 to utter a predetermined speech (e.g., humming or self-talking of the robot 1) and output the behavior control command to the voice-information output controller 114. Alternatively, the main controller 107 may generate a behavior control command for causing the robot 1 to approach the user, that is, the contact person candidate, and output the behavior control command to the drive mechanism controller 116.

The main controller 107 may make any of the above-described implicit approaches, upon obtaining, from the person recognition processor 102, a recognition result indicating that the posture of the user does not change for a certain period of time (e.g., when 5 minutes elapses after seating).

Next, the main controller 107 re-checks whether or not the user contacts the robot 1 within a timeout period (S1330). If the user contacts the robot 1 within the timeout period ("YES" in S1330), the main controller 107 executes the contact-information updating process (S1331). On the other hand, if the user does not contact the robot 1 within the timeout period ("NO" in S1330), the main controller 107 performs the implicit approach again (S1329). The processes in S1329 and S1330 may be omitted. If the user does not contact the robot 1 even when the main controller 107 performs the implicit approach a predetermined number of times in S1329, the main controller 107 may end the processing.

According to the present embodiment, the robot 1 can determine a user who is likely to contact the robot 1 and a waiting place, depending on a time segment and a day of the week, and can wait at the position of the determined waiting place. Thus, the robot 1 can reduce a driving time during contact with the user and can reduce a voice-recognition accuracy decline due to driving sound of the robot 1.

In addition, when the robot 1 fails to find the contact person candidate at the determined waiting place, the robot determines a contact person candidate having the second highest possibility of contacting the robot 1 and a waiting place and waits at the determined waiting place. Thus, even when a contact person candidate is absent at a previous waiting place, it is possible to increase the possibility that the robot 1 is contacted by a contact person candidate at a next waiting place, and it is possible to increase the chance of a user contacting the robot 1.

In addition, when the robot 1 moves to the waiting place and recognizes the contact person candidate, the robot 1 adjusts the waiting position to a position where the robot 1 is easily recognized by the contact person candidate, thus making it possible to make the robot 1 more noticeable to the contact person candidate and making it possible to increase the possibility that the robot 1 is contacted by the contact person candidate.

In addition, when the robot 1 is not contacted by the user at the waiting position within a timeout period, the robot 1 makes an implicit approach on the contact person candidate, thus making it possible to increase the chance of being contacted by the contact person candidate, while suppressing or reducing bothering the contact person candidate.

Modifications described below may be employed in the present disclosure.

(1) Although an example in which the device according to the present disclosure is applied to the robot 1 has been described in the embodiments above, the present disclosure is not limited thereto. The device according to the present disclosure may be applied to, for example, an automobile, other than the robot 1. In such a case, the drive mechanism 115 is implemented by, for example, an engine or an electric motor.

(2) Although, in the embodiments above, an optimum waiting place is determined among pre-set waiting place candidates, the present disclosure is not limited thereto. For example, the robot 1 may determine a position where the robot 1 has been most commonly contacted in a time segment and on a day of the week that are respectively the same as the current time segment and the current day of the week, based on the contact positions contained in the column 407 in the contact information database 1102 and may designate the determined position as the optimum waiting place. In this case, the robot 1 may map the contact positions, contained in the column 407 for the corresponding contact information, to blocks in the map information 1101 and designate the block having the largest number of mapped points as the optimum waiting place.

(3) When the position information manager 108 adds a new waiting place candidate to the map information 1101, the contact information manager 109 may execute, on each piece of contact information stored in the contact information database 1102 or 1102A, processing for reevaluating the waiting place candidate that is the closest to the contact position. When a new waiting place candidate is set, the previous waiting place candidate included in the contact information may be no longer the closest waiting place candidate, depending on the contact position. In this aspect, performing such reevaluation can obtain contact information in which the closest waiting place candidate is always associated with the contact position.

(4) The robot 1 may have a communication circuit 117, as illustrated in FIGS. 3 and 12. The communication circuit 117 is connected to a server 500 through an external network to provide connection between the robot 1 and the server 500 (one example of an external server) so as to allow mutual communication. In this case, the server 500 may execute the processing for determining a waiting place, and the processor 100 may perform only the processing for causing the robot 1 to move to the waiting place determined by the server 500. In this case, the position information manager 108, the contact information manager 109 or 109A, and the memory 110 may be provided in the server 500.

According to the present disclosure, since it is possible to increase the chance of being contacted by a user, while reducing cases in which voice recognition is executed during driving. Accordingly, the present disclosure is useful for robots that engage with users while performing voice recognition.

What is claimed is:

1. A device that communicates with a human through voice recognition of voice of the human, the device comprising:
   a drive mechanism that drives the device; and
   a processor,
   wherein the processor controls the drive mechanism to drive the device to a waiting place for the device to contact the human, and
   the waiting place is determined based on contact information that is history of contact between the device and the human.

2. The device according to claim 1,
   wherein the contact information is information in which time information and place information are associated with each other, the time information including at least one of a time point at which the device contacted the human, a time segment in which the device contacted the human, a date on which the device contacted the human, and a day of week on which the device contacted the human, and the place information including at least one of a position where the device contacted the human and waiting place information regarding a waiting place where the device had waited when the device contacted the human.

3. The device according to claim 2,
   wherein the contact information is information in which the time information, the place information, and information regarding the human who contacted the device are associated with each other.

4. The device according to claim 2,
   wherein the waiting place is a place determined based on the place information included in the contact information corresponding to at least one of a current time point, a current time segment, a current date, and a current day of week.

5. The device according to claim 3,
   wherein, in the waiting place determination based on the contact information, the contact information corresponding to a particular human pre-defined depending on at least one of a particular time segment and a particular day of week is excluded.

6. The device according to claim 1, wherein the processor further controls the drive mechanism to cause the device to wait at the determined waiting place or in a vicinity of the waiting place.

7. The device according to claim 6, further comprising:
a microphone that acquires sound in a vicinity of the device,
wherein the processor further
controls the microphone to acquire sound in the vicinity of the device at the determined waiting place, while causing the device to wait, and
controls, when a sound level of the acquired sound exceeds a threshold, the drive mechanism to drive the device to a place where the sound level is lower than or equal to the threshold.

8. The device according to claim 6, further comprising:
a camera that acquires video in a vicinity of the device,
wherein, while causing the device to wait, the processor further controls the drive mechanism to turn the device to point the camera in a direction opposite to an obstacle.

9. The device according to claim 1, further comprising:
a speaker that outputs voice,
wherein the processor controls the speaker to output voice for prompting the human so as to place, at a first place, a charger for charging the device, and
the first place is a place that is included in the contact information and where the device has contacted the human for a longest period of time.

10. The device according to claim 1, further comprising:
a display that displays information,
wherein the processor controls the display to display information for prompting the human so as to place, at a first place, a charger for charging the device, and
the first place is a place that is included in the contact information and where the device has contacted the human for a longest period of time.

11. The device according to claim 1,
wherein the processor controls the drive mechanism to cause the device to execute motion for prompting the human so as to place, at a first place, a charger for charging the device, and
the first place is a place that is included in the contact information and where the device has contacted the human for a longest period of time.

12. The device according to claim 1, further comprising:
a microphone that acquires sound in a vicinity of the device,
wherein when it is determined based on the acquired sound that the human makes an affirmative response, the contact information is updated.

13. The device according to claim 1, further comprising:
a first sensor that detects that the device is physically touched by the human,
wherein when it is determined based on a result of the detection by the first sensor that the human makes an affirmative response, the contact information is updated.

14. The device according to claim 13,
wherein, when it is determined based on a result of the detection by the first sensor that the device is physically touched by the human, and it is determined that the device is raised by the human for merely moving the device, the contact information is not updated.

15. The device according to claim 2,
wherein the waiting place information included in the contact information indicates any of waiting place candidates pre-set in a predetermined space, and a position of contact between the device and the human is located within a predetermined range from a position of the waiting place candidate.

16. The device according to claim 2,
wherein the waiting place information included in the contact information indicates any of waiting place candidates pre-set in a predetermined space, and
the waiting place candidate where the device and the human have most commonly contacted each other in a time segment to which a current time point belongs is designated as the waiting place.

17. The device according to claim 16,
wherein the waiting place candidate where the device and the human have most commonly contacted each other in the time segment to which the current time point belongs and on a day of week that is the same as a current day of week is designated as the waiting place.

18. The device according to claim 1,
wherein the processor determines the waiting place.

19. The device according to claim 1, further comprising:
a communication circuit connected to an external network,
wherein the external server connected through the external network determines the waiting place.

20. The device according to claim 1,
wherein the device comprises a robot.

21. A method for causing a device that communicates with a human through voice recognition of voice of the human to wait, the method comprising:
determining a waiting place for the device to contact the human, based on contact information that is history of contact between the device and the human; and
controlling the drive mechanism to drive the device to the determined waiting place.

* * * * *